US012674810B2

(12) United States Patent
Davey et al.

(10) Patent No.: US 12,674,810 B2
(45) Date of Patent: Jul. 7, 2026

(54) SCALABLE, MOBILE, AND RECONFIGURABLE MODULES FOR PROCESSING BIOLOGICAL AND CHEMICAL MATERIALS

(71) Applicant: GINKGO BIOWORKS, INC., Boston, MA (US)

(72) Inventors: Jay S. Davey, Redwood City, CA (US); Matthew Jonathan Myers, Oakland, CA (US); William Serber, Oakland, CA (US); Aneesh Khullar, Sunnyvale, CA (US); Christopher James Bremner, Emeryville, CA (US); David J. McLoughlin, Walnut Creek, CA (US)

(73) Assignee: GINKGO BIOWORKS, INC., Boston, MA (US)

( * ) Notice: Subject to any disclaimer, the term of this patent is extended or adjusted under 35 U.S.C. 154(b) by 0 days.

(21) Appl. No.: 16/616,924

(22) PCT Filed: May 23, 2019

(86) PCT No.: PCT/US2019/033733
§ 371 (c)(1),
(2) Date: Nov. 25, 2019

(87) PCT Pub. No.: WO2019/226887
PCT Pub. Date: Nov. 28, 2019

(65) Prior Publication Data
US 2020/0393477 A1 Dec. 17, 2020

Related U.S. Application Data

(60) Provisional application No. 62/676,092, filed on May 24, 2018.

(51) Int. Cl.
*G01N 35/00* (2006.01)
*B65G 1/00* (2006.01)
(Continued)

(52) U.S. Cl.
CPC ............. *G01N 35/04* (2013.01); *B65G 61/00* (2013.01); *G01N 35/0099* (2013.01)

(58) Field of Classification Search
CPC .... G01N 35/04; G01N 35/0099; G01N 35/00; G01N 35/02; G01N 2035/00326;
(Continued)

(56) References Cited

U.S. PATENT DOCUMENTS 5,014,875 A 5/1991 McLaughlin et al.
5,363,885 A 11/1994 McConnell et al.
(Continued)

FOREIGN PATENT DOCUMENTS

CN 101332439 A 12/2008
CN 102722105 A 10/2012
(Continued)

OTHER PUBLICATIONS

Hawker, CD; Laboratory Automation: Total and Subtotal; Clinics in Laboratory Medicine; 27; (2007) pp. 749-770.*
(Continued)

*Primary Examiner* — Charles Capozzi
*Assistant Examiner* — Michael Stanley Gzybowski
(74) *Attorney, Agent, or Firm* — Weaver Austin Villeneuve & Sampson LLP

(57) ABSTRACT

Disclosed are apparatuses, systems, and methods for processing materials, including biological or chemical materials. A manufacturing module may include a work station configured to perform a process involving equipment capable of use with biological or chemical material, a first transportation segment that is configured to connect and
(Continued)

disconnect with a second transportation segment such that when connected, a carrier of the biological or chemical material can be transported from the first transportation segment to the second transportation segment, a pick and place robot configured to move an element between the first transportation segment and the work station; and a movement mechanism configured to allow the work station, the first transportation segment, and the pick and place robot to be moved as a single unit. A system may include a plurality of manufacturing modules that are reconfigurable to a plurality of configurations.

22 Claims, 18 Drawing Sheets

(51) Int. Cl.
　　B65G 61/00　　　(2006.01)
　　G01N 35/04　　　(2006.01)
(58) Field of Classification Search
　　CPC .. G01N 2035/046; B65G 61/00; B65G 35/06;
　　　　　　B65G 37/02; B65G 47/90; B65G 47/904
　　See application file for complete search history.

(56) References Cited

U.S. PATENT DOCUMENTS

| | | | |
|---|---|---|---|
| 5,470,744 A | 11/1995 | Astle | |
| 5,928,952 A | 7/1999 | Hutchins et al. | |
| 6,337,050 B1* | 1/2002 | Takahashi | G01N 35/026 |
| | | | 422/63 |
| 6,589,789 B1* | 7/2003 | Hubert | G01N 35/0099 |
| | | | 422/504 |
| 7,308,338 B2 | 12/2007 | Guerra | |
| 7,490,710 B1 | 2/2009 | Weskamp et al. | |
| 7,560,071 B2 | 7/2009 | Nichols et al. | |
| 8,038,942 B2 | 10/2011 | Pang et al. | |
| 8,060,248 B1 | 11/2011 | Boyer et al. | |
| 8,546,110 B2 | 10/2013 | Ammann et al. | |
| 8,556,564 B2 | 10/2013 | Miller | |
| 8,703,492 B2 | 4/2014 | Self et al. | |
| 8,734,720 B2 | 5/2014 | Nichols et al. | |
| 8,795,593 B2 | 8/2014 | Nichols et al. | |
| 8,877,128 B2 | 11/2014 | Fukugaki et al. | |
| 8,996,320 B2 | 3/2015 | Gwynn et al. | |
| 9,158,299 B2 | 10/2015 | Kouno et al. | |
| 9,506,943 B2 | 11/2016 | Muller et al. | |
| 9,623,405 B2 | 4/2017 | Nichols et al. | |
| 9,671,798 B2 | 6/2017 | Hodge et al. | |
| 9,880,184 B2 | 1/2018 | Nichols et al. | |
| 10,252,860 B2 | 4/2019 | Nichols et al. | |
| 10,444,251 B2 | 10/2019 | Nichols et al. | |
| 10,613,110 B2 | 4/2020 | Nichols et al. | |
| 10,955,430 B2 | 3/2021 | Guarracina et al. | |
| 11,045,811 B2 | 6/2021 | Guarracina et al. | |
| 11,123,870 B2 | 9/2021 | Gilchrist | |
| 11,167,434 B2 | 11/2021 | Cochran et al. | |
| 2002/0090320 A1 | 7/2002 | Burow et al. | |
| 2004/0107014 A1 | 6/2004 | Park | |
| 2005/0239127 A1 | 10/2005 | Ammann et al. | |
| 2006/0009047 A1 | 1/2006 | Wirth et al. | |
| 2006/0177922 A1 | 8/2006 | Shamah et al. | |
| 2006/0201810 A1 | 9/2006 | Paschetto et al. | |
| 2006/0285945 A1 | 12/2006 | Hofmeister et al. | |
| 2007/0025887 A1* | 2/2007 | Baeuerle | B01L 9/527 |
| | | | 422/400 |
| 2007/0237675 A1 | 10/2007 | Nichols et al. | |
| 2009/0003976 A1 | 1/2009 | Hofmeister et al. | |
| 2010/0126286 A1* | 5/2010 | Self | G01N 35/026 |
| | | | 73/863.81 |
| 2010/0291619 A1 | 11/2010 | Robinson et al. | |
| 2010/0303590 A1 | 12/2010 | Pedrazzini | |

| | | | |
|---|---|---|---|
| 2012/0214167 A1 | 8/2012 | Thomson et al. | |
| 2013/0017131 A1 | 1/2013 | Galliher et al. | |
| 2014/0277683 A1 | 9/2014 | Gupta et al. | |
| 2015/0079592 A1 | 3/2015 | Larsen et al. | |
| 2015/0212103 A1* | 7/2015 | Pedrazzini | G01N 35/04 |
| | | | 73/863.01 |
| 2016/0238625 A1* | 8/2016 | Raicu | B65G 1/06 |
| 2017/0097371 A1 | 4/2017 | Pedrazzini | |
| 2017/0176481 A1 | 6/2017 | Accurso et al. | |
| 2017/0219614 A1 | 8/2017 | Cook et al. | |
| 2019/0107547 A1* | 4/2019 | VanSickler | G01N 35/0099 |
| 2020/0233003 A1 | 7/2020 | Nichols et al. | |
| 2021/0208171 A1 | 7/2021 | Guarracina et al. | |
| 2021/0322993 A1 | 10/2021 | Guarracina et al. | |
| 2021/0389339 A1 | 12/2021 | Gilchrist et al. | |
| 2022/0001540 A1 | 1/2022 | Gilchrist et al. | |

FOREIGN PATENT DOCUMENTS

| | | | |
|---|---|---|---|
| CN | 103370627 A | 10/2013 | |
| CN | 109982817 A | 7/2019 | |
| DE | 602007023001 T2 | 5/2012 | |
| EP | 2008112 B1 | 5/2012 | |
| EP | 3043185 A1 | 7/2016 | |
| EP | 3185016 A1 | 6/2017 | |
| EP | 3507064 A1 | 7/2019 | |
| EP | 3265829 B1 | 5/2020 | |
| EP | 3732490 A1 | 11/2020 | |
| EP | 3746381 A1 | 12/2020 | |
| EP | 3922995 A1 | 12/2021 | |
| JP | 2008/241513 A | 10/2008 | |
| KR | 20110041053 A | 4/2011 | |
| WO | WO2007/123662 A2 | 11/2007 | |
| WO | WO2007/123662 A3 | 12/2007 | |
| WO | WO2008/098719 A2 | 8/2008 | |
| WO | WO2009/140183 A1 | 11/2009 | |
| WO | WO2016/141000 A1 | 9/2016 | |
| WO | WO-2017106271 A1 | 6/2017 | |
| WO | WO2017/143182 A2 | 8/2017 | |
| WO | WO2017/184244 A1 | 10/2017 | |
| WO | WO2017/221155 A1 | 12/2017 | |
| WO | WO2018/045080 A1 | 3/2018 | |
| WO | WO2019/152953 A1 | 8/2019 | |
| WO | WO2019/152956 A1 | 8/2019 | |

OTHER PUBLICATIONS

Wyard-Scott, L. et al., "Design of a teleoperated mobile robot test platform," IEEE Pacific Rim Conference on Communications, Victoria, B.C., Aug. 20, 1997, pp. 577-580.
"Modular and Easily Reconfigured Manufacturing Cells," retrieved from www.ipi.singapore.org, accessed Nov. 11, 2007.
"Remote center compliance," from *Wikipedia,* Apr. 16, 2018, last edited Nov. 11, 2014, 1 p.
Transcriptic Inc. product information for "The robotic cloud lab," 2018, 11 pp.
"Modular and Easily Reconfigured Manufacturing Cells," retrieved from Vietnam Investment and Technology Exchange (Vintex), Aug. 22, 2017, updated on Dec. 1, 2018, 5 pp.
HighRes Biosolutions product information for "MicroDock & MicroCart," 2019, 4 pp.
PCT International Search Report and Written Opinion [ISA/US] dated Sep. 20, 2019 for PCT/US2019/33733.
PCT International Preliminary Report on Patentability and Written Opinion dated Nov. 24, 2020 issued in PCT/US2019/33733.
EP European Extended Search Report dated Feb. 3, 2022 issued in EP 19806865.2.
Anonymous: "Society for Laboratory Automation and Screening—Wikipedia", Oct. 23, 2021 (Oct. 23, 2021), pp. 1-3, XP055884124, Retrieved from the Internet: URL:https://en.wikipedia.org/wiki/Society_for_Laboratory_Automation_and_Screening [retrieved on Jan. 26, 2022].
JP Office Action dated Jun. 12, 2023, in application No. JP20200565367 with English translation.
CN Office Action dated Aug. 31, 2023, in Application No. CN201980045564.8 with English translation.

(56) References Cited

OTHER PUBLICATIONS

EP Office Action dated Nov. 22, 2023 in EP Application No.
19806865.2.
JP Office Action dated Nov. 20, 2023, in JP Application No.
2020-565367 with English translation.
EP Office Action dated Jun. 27, 2025 in EP Application No.
19806865.2.
U.S. Appl. No. 19/213,714, inventors Davey J.S et al., filed May 20,
2025.

\* cited by examiner

SCALABLE, MOBILE, AND RECONFIGURABLE MODULES FOR PROCESSING BIOLOGICAL AND CHEMICAL MATERIALS

INCORPORATION BY REFERENCE

A PCT Request Form is filed concurrently with this specification as part of the present application. Each application that the present application claims benefit of or priority to as identified in the concurrently filed PCT Request Form is incorporated by reference herein in its entirety and for all purposes.

FIELD

This disclosure pertains to reconfigurable manufacturing modules. More particularly, it pertains to scalable, mobile, and reconfigurable modules for processing materials such as biological or chemical materials.

BACKGROUND

Products, including biological or chemical materials, may be manufactured using various arrangements of equipment along an assembly line. A typical assembly line may be designed and built for certain production parameters such as product, amount, cost, time, and throughput. Once built, it is difficult to scale or reconfigure the assembly line to make changes to any of these parameters. For example, the product itself generally cannot be changed, the amount of product produced can only be changed by increasing or decreasing production time, and the assembly line generally cannot be changed to produce a product in a different manner.

One obstacle to scaling or reconfiguring an assembly line is that moving assembly line equipment is generally difficult, time consuming, and expensive. The weight, size, and configuration of some equipment may require the use of heavy transportation equipment such as a forklift or crane to move the equipment. Further, the rearrangement or changing of equipment may involve taking the assembly line offline. Moving can also involve a significant amount of open factory floor space. Further challenges to scaling and reconfiguring assembly lines include stationary transportation systems and utility systems, as well as fixed positions for connections to these systems.

It would be desirable to have apparatuses, methods, and systems for scaling and reconfiguring an assembly line.

SUMMARY

In some embodiments, a manufacturing module may be provided. The manufacturing module may include a work station configured to perform a process involving equipment capable of use with biological or chemical material, a first transportation segment that spans across the manufacturing module and is configured to connect and disconnect with a second transportation segment such that when connected, a carrier of the biological or chemical material can be transported from the first transportation segment to the second transportation segment, a pick and place robot configured to move an element between the first transportation segment and the work station, and a movement mechanism configured to allow the work station, the first transportation segment, and the pick and place robot to be moved as a single unit.

In some embodiments, the manufacturing module may further include an enclosure, and the movement mechanism and the first transportation segment may be connected to the enclosure.

In some such embodiments, the manufacturing module may further include a moveable shelf connected to the enclosure. The work station may be connected to the moveable shelf, and the moveable shelf may be configured to be moved between a first position and a second position such that in the first position, the moveable shelf is located within the enclosure, and in the second position, the moveable shelf is located at least partially outside the enclosure.

In some embodiments, the manufacturing module may further include a bumper connection that may extend away from a module housing by a first horizontal distance and that may be configured to connect with another manufacturing module.

In some such embodiments, the bumper connection may be configured to connect with a bumper connection of another manufacturing module.

In some embodiments, the movement mechanism may be configured to allow the work station, the first transportation segment, and the pick and place robot to be moved as a single unit in a vertical direction.

In some such embodiments, the movement mechanism may be configured to allow the work station, the first transportation segment, and the pick and place robot to be moved as a single unit in a horizontal direction.

In some embodiments, the work station may be one of a cell transfection unit, a cell transformation unit, a cell transduction unit, an electroporation unit, a microinjection unit, a cell deformation unit, a centrifuge, a cytometer, a deionizer, a dispenser, an evaporator, a freezer, a heater, an imager, an incubator, a liquid handler, a mixer, a nucleic acid purifier, a pipettor, a sonicator, a storage unit, a thermal cycler, a real-time quantitative polymerase chain reactor (qPCR), a polymerase chain reactor (PCR) machine, a cell dispenser, a colony picker, a high-performance liquid chromatography unit, a mass spectrometer, a microfluidics unit, a fermenter, an autoclave, a barcode printer, a barcode applier, a barcode reader, a capper, a decapper, a counter, an air knife, a docking station, a carousel, a sample storage, a pierce tool, a plate reader, a plate sealer, a plate peeler, a plate washer, a stacker, a tube sorter, a biosafety cabinet, and a laboratory bench.

In some embodiments, the manufacturing module may further include a tunnel that may be located over the first transportation segment and may be configured to cover the first transportation segment.

In some embodiments, the pick and place robot may further include a gripper configured to grip an element on the first transportation segment during transportation of the element between the work station and the first transportation segment.

In some such embodiments, the gripper may include alignment features that may be configured to contact alignment surfaces on the carrier.

In some such embodiments, the alignment features may be pins and the alignment surfaces may be tapered holes.

In some such embodiments the carrier may have a first end, a second end, and two sides, the alignment surfaces may be positioned on the sides of the carrier, and the alignment features may be configured to contact the alignment surfaces on the sides of carrier.

In some such embodiments, the gripper may include a frame and gripping surfaces configured to grip the element, and the frame may not extend over the area between the gripping surfaces in the vertical direction.

In some embodiments, a system may be provided. The system may include a plurality of manufacturing modules and each manufacturing module may include a work station configured to perform a process on or house a biological or chemical material or a material container, a first transportation segment that spans across the manufacturing module and is configured to connect and disconnect with a second transportation segment such that when connected, a carrier configured to support an element can be transported from the first transportation segment to the second transportation segment, a pick and place robot configured to move the element between the first transportation segment and the work station, a movement mechanism configured to allow the work station, the first transportation segment, and the pick and place robot to be moved as a single unit, and a utility connection configured to be connected to a connector of a utility, and a controller having at least one processor and a memory. The at least one processor may be operatively connected with each of the manufacturing modules, and the memory may store computer executable instructions for controlling the at least one processor to cause each of the transportation segments to move the carrier across each manufacturing module, cause each pick and place robot to move an element between the transportation segment and the work station, cause each work station to perform a process on or house the biological or chemical material or on the material container, and cause the carrier to be moved between each of the manufacturing modules.

In some embodiments, the system may further include one or more the carrier that may be configured to be compatible with a Society for Biomolecular Screening (SBS) footprint object.

In some embodiments, the transportation segments of the plurality of manufacturing modules may be at a substantially equal vertical height with respect to each other.

In some embodiments, the system may further include a second track section that may be configured to transport the carrier, the second track section is parallel to at least one of the first transportation segments.

In some such embodiments, the second track section may include a first switch, a second switch, and a second transportation segment spanning between the first switch and the second switch, and the first switch and second switch may each be configured to transport a carrier between the second transportation segment and a first transportation segment.

In some embodiments, the system may further include a modular subfloor tile that may include one or more utilities and the utility connection of at least one of the manufacturing modules may be connected to the one or more utilities of the modular subfloor tile.

In some such embodiments, the system may further include a plurality of modular subfloor tiles. The one or more utilities of each modular subfloor tile may be configured to be connected with the one or more utilities of adjacent modular subfloor tiles, and the modular subfloor tiles may be configured to be connected to each other and reconfigurable.

In some other such embodiments, the module subfloor tile may include one or more of: an electrical connection, an ethernet port, a compressed air connection, a gas connection, a liquid port, a vacuum connection, and an uninterruptible power supply.

In some embodiments, the system may further include a modular moveable cart that includes a movement mechanism and one or more utilities, and the utility connection of at least one of the manufacturing modules may be connected to the one or more utilities of the modular moveable cart.

In some such embodiments, the system may further include a plurality of modular moveable carts. The one or more utilities of each modular moveable cart may be configured to be connected with the one or more utilities of adjacent modular moveable carts, and the modular moveable carts may be configured to be connected to each other and reconfigurable.

In some such embodiments, the modular moveable cart may include one or more of an electrical connection, an ethernet port, a compressed air connection, a gas connection, a liquid port, a vacuum connection, and an uninterruptible power supply.

In some embodiments, adjacent modules may be connected to each other.

In some such embodiments, each module may further include a bumper connection, and the bumper connection of each module may be connected to an adjacent module.

In some embodiments, the first transportation segments of adjacent manufacturing modules may be connected to each other.

In some embodiments, the work station may be configured to perform a process on or house a biological or chemical material and is one of a cell transfection unit, a cell transformation unit, a cell transduction unit, an electroporation unit, a microinjection unit, a cell deformation unit, a centrifuge, a cytometer, a deionizer, a dispenser, an evaporator, a freezer, a heater, an imager, an incubator, a liquid handler, a mixer, a nucleic acid purifier, a pipettor, a sonicator, a storage unit, a thermal cycler, and a real-time quantitative polymerase chain reactor (qPCR), a colony picker, a high-performance liquid chromatography unit, a mass spectrometer, a microfluidics unit, a fermenter, a bulk dispenser, and an autoclave.

In some embodiments, the work station may be configured to perform a process on a container of a biological or chemical material and is one of a barcode printer, a barcode applier, a barcode reader, a capper, a decapper, a counter, an air knife, a docking station, a carousel, a sample storage, a hotel, a pierce tool, a plate reader, a plate sealer, a plate peeler, a plate washer, a stacker, a tube sorter, a biosafety cabinet, and a laboratory bench.

In some embodiments, a meta-module may be provided. The meta-module may include a plurality of manufacturing modules that are reconfigurable to a plurality of configurations, wherein each module comprises a transportation segment such that in each configuration, the plurality of manufacturing modules are connected to each other such that a carrier of a material is movable along a transportation pathway that extends through the plurality manufacturing modules and that comprises at least all of the transportation segments of the plurality of manufacturing modules, and in each configuration, the plurality of manufacturing modules are configured to be moved as a single unit.

In some embodiments, a system may be provided. The system may include a transportation pathway configured to transport a carrier that may be configured to support an element, and a plurality of manufacturing modules that each include a work station configured to perform a process on or hold a material, a pick and place robot configured to move an element between the transportation pathway and the work station, and a movement mechanism configured to allow the work station and the pick and place robot to be moved as a single unit. The manufacturing modules may be positioned along the transportation pathway such that the pick and place robots are able to transport an element between the transportation pathway and the work station, and the manufacturing modules may be reconfigurable into a plurality of configurations along the transportation pathway such that in each configuration the pick and place robots are able to transport an element between the transportation pathway and the work station.

In some embodiments, in at least one configuration, the plurality of manufacturing modules may be configured to be moved as a single unit.

In some embodiments, in a first configuration, the plurality of manufacturing modules may be arranged along the transportation pathway in a first order, and in a second configuration, the plurality of manufacturing modules may be arranged along the transportation pathway in a second order that is different than the first order.

In some such embodiments, in a third configuration, the plurality of manufacturing modules may include N manufacturing modules, in a fourth configuration, the plurality of manufacturing modules may include M manufacturing modules, and M may be lesser than N or greater than N.

In some embodiments, a system for producing a plurality of organisms may be provided. The system may include a plurality of manufacturing modules that are reconfigurable to a plurality of configurations that each include a work station configured to perform a process on or house a material. The plurality of manufacturing modules may be connected to each other such that a carrier of a material is movable along a transportation pathway that extends through the plurality manufacturing modules, and in each configuration, the plurality of manufacturing modules may be configured to produce a different organism.

In some embodiments, in a first configuration the plurality of manufacturing modules may be arranged in a first order and are configured to produce a first organism, and in a second configuration, the plurality of manufacturing modules may be arranged in a second order that is different than the first order and may be configured to produce a second organism.

In some embodiments, in a third configuration, the plurality of manufacturing modules may include N manufacturing modules and may be configured to produce a third organism, in a fourth configuration, the plurality of manufacturing modules may include M manufacturing modules and may be configured to produce a fourth organism, and M may be lesser than N or greater than N.

In some embodiments, the production of a different organism may include cell transformation.

In some such embodiments, the production of a different organism may further include analysis testing.

In some embodiments, the production of a different organism may include introducing a plasmid into a microbe.

In some such embodiments, the production of a different organism may further include plating at one of the manufacturing modules and colony picking at another one of the manufacturing modules.

In some embodiments, in each configuration, the plurality of manufacturing modules may be configured to produce a different engineered organism.

In some such embodiments, the engineered organism may include an engineered bacteria.

In some such embodiments, the engineered organism may include an engineered fungus.

In some other such embodiments, the engineered fungus may include an engineered yeast.

In some other such embodiments, the engineered organism may include an engineered mammalian cell.

In some such embodiments, in one configuration, the engineered organism may include an engineered bacteria, and in another configuration, the engineered organism may include an engineered fungus.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific implementations, it will be understood that these implementations are not intended to be limiting.

Described herein are apparatuses, methods, and systems for reconfiguring and/or scaling production processes. According to various embodiments, the apparatuses, methods, and systems may include or use modular, scalable, and reconfigurable elements. In some embodiments, the apparatuses, methods, and systems related to the production of organism and related biological and chemical processing are provided.

Reconfigurable systems described herein include mobile, connectable, and reconfigurable manufacturing modules that when connected together are configured to produce a product or perform other processing. As discussed in greater detail below, a manufacturing module (also referred to as a "module") is a basic building block of these systems. A module may include features that enable it to be quickly and easily moved and connected with other manufacturing modules into numerous different configurations. In some embodiments, a module includes a transportation segment that is connectable with transportation segments of other modules to create a transportation pathway along the modules.

Figure 1A:
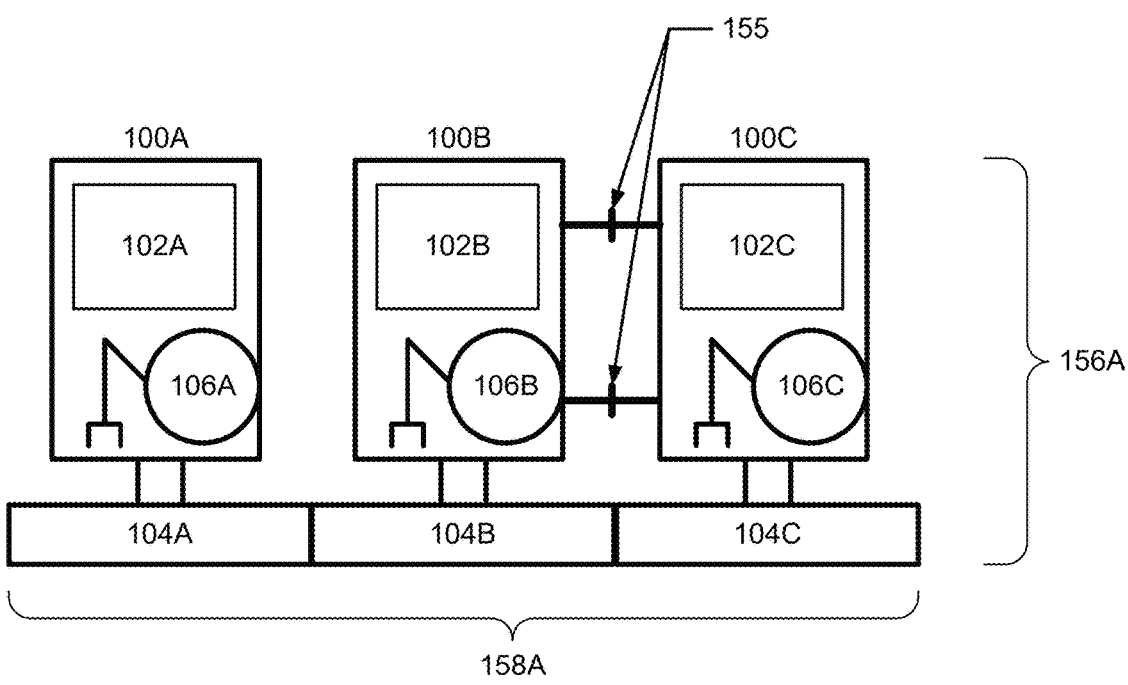
FIG. 1A depicts two configurations of an example reconfigurable system.
Figure 1A:
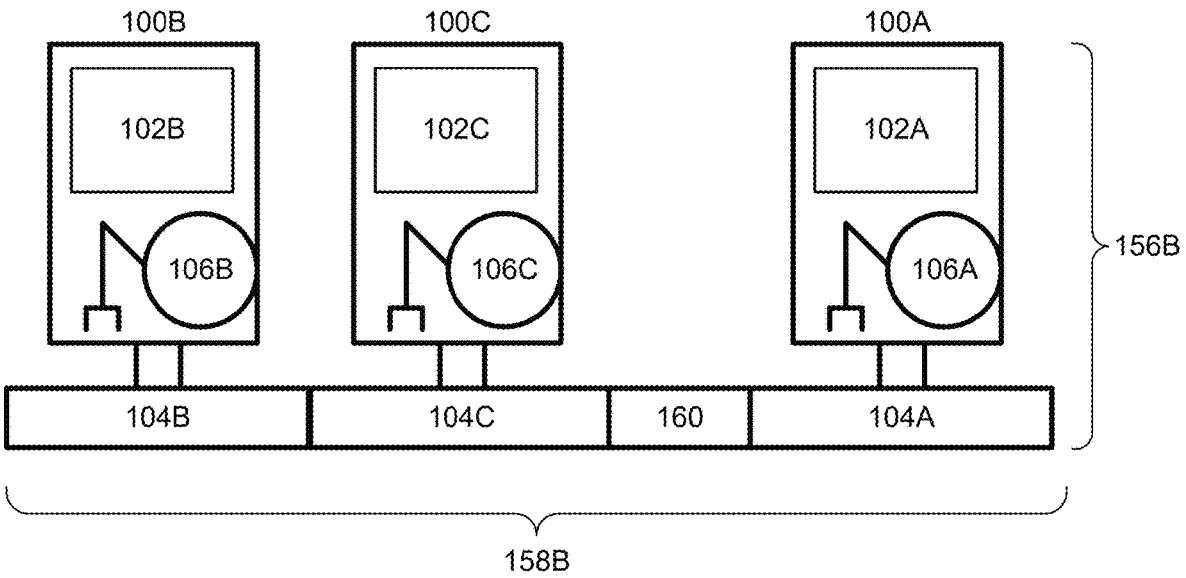

FIG. 1A depicts two configurations of an example reconfigurable system. This example system includes three modules 100A-100C that are connected together to form a transportation pathway along these modules. For illustration purposes in FIG. 1A, the modules 100A-100C include a work station 102A-102C, a transportation segment 104A-104C, and a pick and place robot 106A-106C. As discussed further below, each work station may be configured to perform one or more processing operations on a material, the transportation segment may be configured to transport a carrier of a material, and the pick and place robot may be configured to transport an element (e.g., either the material or its carrier) between the transportation segment and the work station of that module. In the top portion of FIG. 1A, the three modules are arranged in a first configuration 156A such that module 100B is interposed between modules 100A and 100C and the transportation pathway 158A is formed along these modules. In the bottom portion of FIG. 1A, the three modules have been reconfigured and connected to each other into a second configuration 156B. As can be seen, in the second configuration 156B, a longer transportation pathway 158B is formed by the transportation segments 104B, 104C, 160, and 104A and the order of the modules is different. Additionally, modules may be removed or added to the reconfigurable system. For example, FIG. 1B depicts a third configuration 156C of the example reconfigurable system of FIG. 1A in which a fourth module 100D has been added to the system such that it is connected to module 100C and the transportation pathway 158D is formed along all four modules.

Figure 1B:
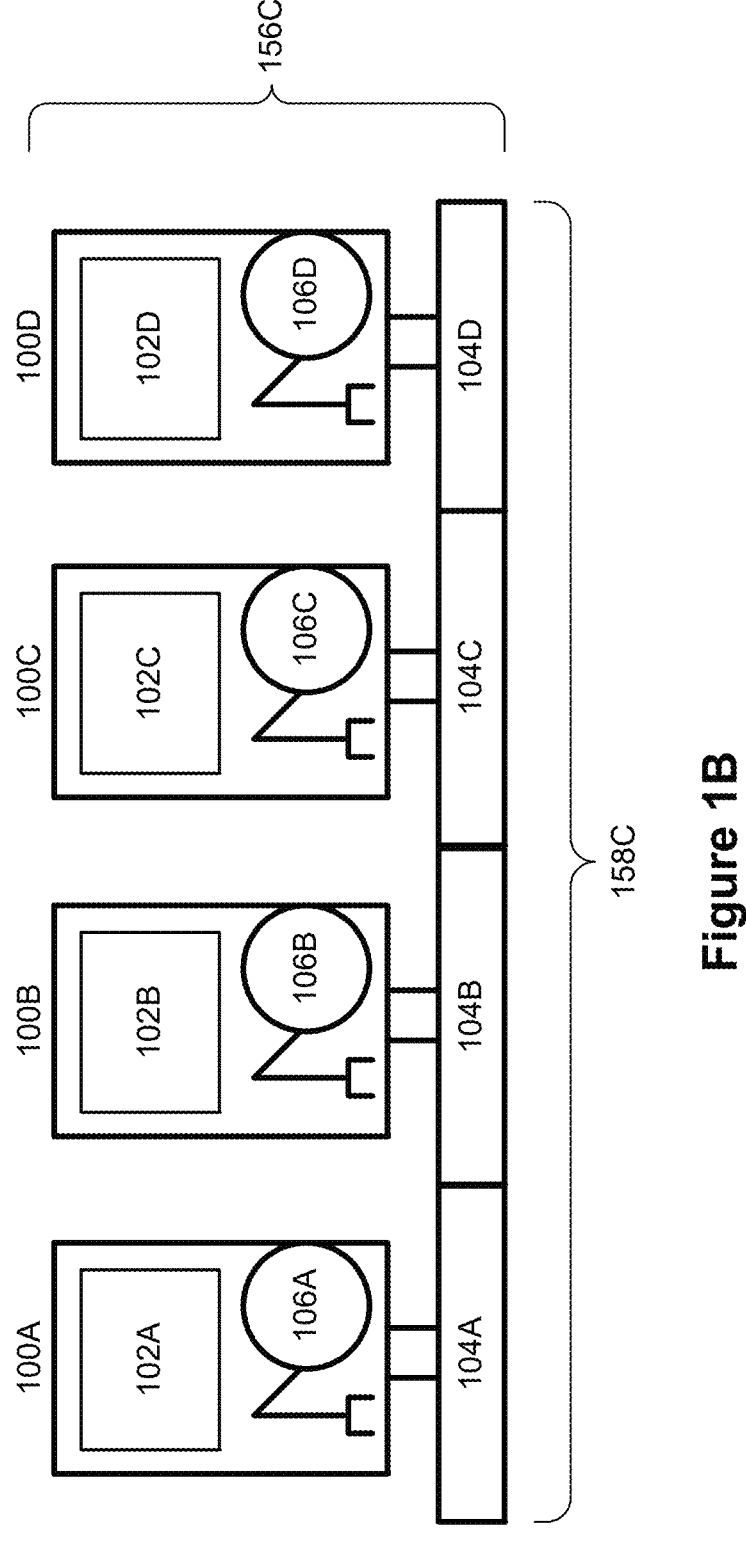
FIG. 1B which depicts a third configuration of the example reconfigurable system of FIG. 1A.

FIGS. 1A and 1B provide examples of different configurations of a reconfigurable system according to various embodiments. Further details of the reconfigurable systems are described further below with reference to FIGS. 12-16, after a discussion of examples of manufacturing modules with respect to FIGS. 2-10.

Manufacturing Module Examples

FIGS. 2-10 depict examples of a manufacturing module and components thereof. As described above, some embodiments of a module include a section of a transportation segment, such as a rail. Other embodiments of a module do not include a transportation segment. Such modules may be connectable to a separate transportation segment.

Figure 2:
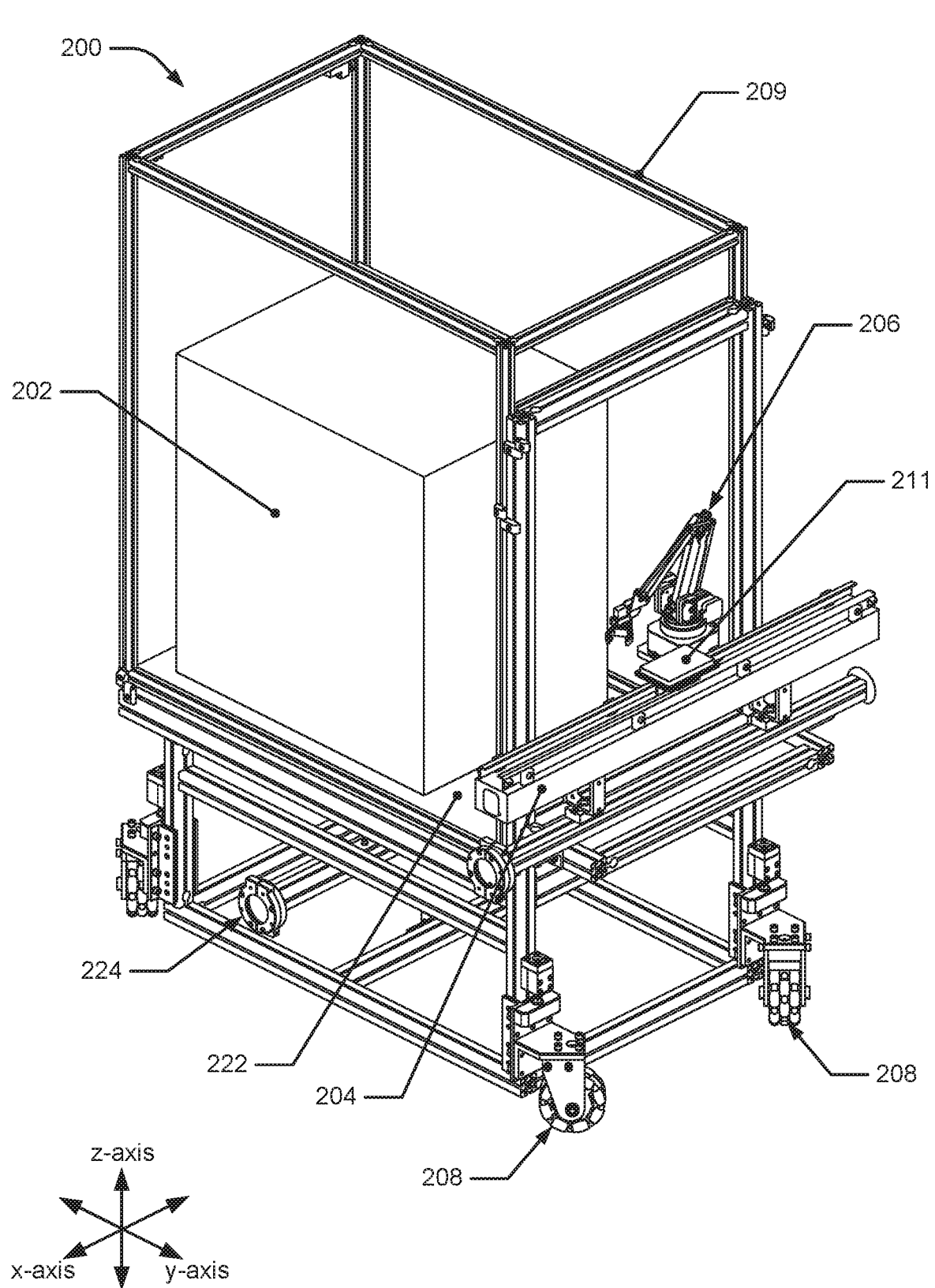
FIG. 2 depicts an isometric view of an example manufacturing module.

FIG. 2 depicts an isometric view of an example manufacturing module 200 that includes a work station 202, a transportation segment 204, a pick and place robot 206, and a movement mechanism 208. In some embodiments, the module includes an enclosure 209 to which the elements of the module may be directly or indirectly attached. For instance, the work station 202 is directly attached to a shelf 222 that is directly attached to the enclosure 209 (as described below, the shelf may be slidably connected to the enclosure 209), and thus the work station 202 is indirectly attached to the enclosure 209. The transportation segment 204 is attached to a portion of the enclosure 209, the pick and place robot 206 is attached to the enclosure 209, as are the movement mechanisms 208.

The work station 202 may be any piece of equipment that is capable of use with a material, including a biological or chemical material, or with a material container. In some embodiments, the work station may be configured to one or more of the following: perform a process on a material, to house or store a material, to dispense a material, to house or store a material container, or to perform a process on a material container. For instance, in some embodiments, the work station may be configured to perform one process on a material, while in some other embodiments the work station may be configured to perform multiple functions, such as multiple different processes on a material or one process on a material and one process on a material container. Examples of processes performed on materials include but are not limited to heating; cooling; thermocycling; electroporation; incubation, addition of one or more other materials such as liquid media, reagents, buffers, stains, and the like; measuring or detecting one or more characteristics of the materials, e.g., by optical detection, weighing, and the like; pooling a material with a similar material; sorting (e.g., cell sorting), and plating a material on a solid media. Examples of processes performed on material containers include but are not limited to stacking, labeling, and sorting material containers. Further examples of such processes are provided below with examples of equipment configured to perform the processes at work stations.

As indicated above, in some embodiments, the material is a biological or chemical material such as but not limited to one or more cells, nucleotides, tissue, and the like. Examples of carriers of such material include multi-well plates such 6-, 12-, 24-, 48-, 96-, 384-, or 1536-well plates, also referred to as microplates, as well as tubes or tube carriers. Examples of equipment capable of use with or capable of housing biological or chemical material or carriers and that may be included at a work station include a cell dispenser configured to dispense one or more cells (e.g., a single cell dispenser like a Namo™ or a Hana™ by Namocell, or a microplate dispenser such as a Tecan D300e Digital Dispense), a cell transfection unit (e.g., a Lonza Nucleofector); a cell transformation unit (e.g., a Bio-Rad MicroPulser™); a cell transduction unit; an electroporation unit configured to introduce material into cells using electricity to open pores in cell membranes (e.g., a ThermoFisher Scientific Neon® Transfection System); a microinjection unit configured inject a substance into a cell or intercellular space, such as by using a micropipette; a cell deformation unit configured to deform a cell, e.g., by the application of pressure on a cell membrane; a centrifuge (e.g., a HighRes MicroSpin); a cytometer (e.g., a Union Biometrica COPAS); a deionizer configured to deionize a piece of equipment like a microplate (e.g., HighRes MicroBlast); a dispenser configured to dispense discrete amounts of liquid or media into one or more containers like a 384-well plate, such as a bulk dispenser, (e.g., an Integra VIAFILL or Kalypsys Dispenser); an evaporator configured to evaporate liquid from a material container (e.g., a Porvair Ultrvap); a freezer configured to reduce the temperature of a material to less than about −20° C., −80° C., −150° C., and −190° C. (e.g., a Brooks BioStore™ III Cryo −190° C.); a heater configured to heat a microplate (e.g., a QInstruments HeatPlate), an incubator configured to receive, heat, incubate, shake, and rotate material containers, such as a microplate (e.g., an inheco Incubator MP); a liquid handler configured to insert and remove liquid from one or more containers sequentially or simultaneously, such as a microplate (e.g., a TECAN Freedom EVO® series); a mixer configured to mix liquid in one or more containers including in a microplate or tube (e.g., a Microsonic HENDRIX SM-100); a nucleic acid purifier configured to purify DNA, RNA, proteins, or cells such as through the use of magnetic-particle processing (e.g., a ThermoFisher Scientific KingFisher™ Flex Purification System); a pipettor configured to remove or insert material or liquid from a material container, such as a microplate (e.g., a CyBio® SELMA); a shaker configured to shake a material container (e.g., a Siemens MicroMix Shaker); a sonicator configured to deliver sonic energy to liquid or other media in order to, for example, shear DNA, shear chromatin, cause cell lysis, cause compound dissolution, cause compound formation, cause tissue disruption and homogenization, and extract samples (e.g., a Brooks SonicMan); a thermal cycler, a real-time quantitative polymerase chain reactor ("qPCR") or a polymerase chain reactor (PCR) machine, or other DNA amplifier configured to raise and lower temperatures of a material container in discrete steps to cause temperature-sensitive reactions such as the amplification of DNA or restriction enzyme digestion (e.g., an Applied Biosystems Vi); an imager configured to capture images of cells and assays including cell imagers that can perform investigative microscopy, high-content screening, imaging of Image organelles, cells, tissues, organisms, and perform fixed end-point assays and live-cell studies (e.g., a GE IN Cell Analyze 2200); a colony picker configured to identify biological colonies (e.g., microbial colonies) on a solid media, to pick some colonies, and to duplicate them on solid or liquid media (e.g., Hudson Robotics, Inc. RapidPick™ Complete Colony Picker); a high-performance liquid chromatography unit configured to separate, identify, and quantify each component in a mixture (e.g., ThermoFisher UltiMate 3000 Standard Binary System), a mass spectrometer configured to measure the masses of elements within a sample (e.g., a ThermoFisher Orbitrap Fusion™ Lumos™ Tribrid™ Mass Spectrometer); a microfluidics unit configured to mix, pump, sort, or control fluid flow; a fermenter configured to support biologically active environments (e.g., a LAMBDA Fermenter—Bioreactor); an autoclave configured for chemical reactions and other processes that may use high pressures or temperatures (e.g., 135° C.), such as steam sterilization (e.g., a Fisherbrand™ SterilElite™ Tabletop Autoclave), such as using bulk dispenser configured to.

Examples of equipment capable of housing a material container or performing a process onto a material container that may be included at a work station include a barcode printer that is configured to print a barcode on a label or on a container (e.g., an Agilent Microplate Labeler/Velocity 11 VCode); a barcode applier that is similarly configured to apply a barcode onto a container of material or other item (e.g., a KBiosystems Gecko); a barcode reader that is configured to read a barcode (e.g., a Ziath DataPag™ High Speed Linear Rack Version 2); a capper and decapper which are configured to, respectively, remove a cap and install a cap, onto an element, such as a tube (e.g., a Brooks ACD96 (Automated Capper/Decapper96 Position)); a storage unit configured to hold and store a plurality of material containers (e.g., a HighRes AmbiStore™); an air knife configured to apply a burst of air in order to remove liquid or debris from a material container (e.g., a HighRes MicroBlast); a carousel configured to hold and rotate material containers (e.g., an Agilent Labware MiniHub); a hotel configured to hold lids or other equipment related to a material container (e.g., a HighRes LidValet); a sample storage configured to hold samples or consumables, such as glassware, disposable equipment, gases, reagents, and media; a pierce tool configured to pierce portions of a material container such as a foil or rubber (e.g., a KBiosystems k-Pierce); a plate reader configured to detect biological, chemical, or physical events of material, such as biological material in a microfitter plate, by using, for instance, absorbance, fluorescence, luminescence, time-resolved fluorescence, fluorescence polarization, and light scattering and nephelometry (e.g., a TECAN Infinite® 200 PRO); a plate sealer configured to apply a sealing material to a material container (e.g., an Agilent PlateLoc Thermal Microplate Sealer); a plate peeler configured to remove a sealing material from a material container (e.g., a Kbiosystems Chameleon XT); a plate washer configured to wash a material container (e.g., TECAN Power Plate Washer); a stacker configured to move, stack, and hold material containers (e.g., an Agilent Velocity 11 VStack Stacker); a tube sorter configured to sort tubes (e.g., a T&O LabSystems ATRAS TS). In some embodiments, the work station may also be configured to hold the material container while it sits idle as well as configured to allow a person to perform a process on a biological or chemical material or on a container of material. For instance, the work station may include a laminar flow hood, a biosafety cabinet (e.g., an enclosed, ventilated laboratory work space such as a LABCONCO Biosafety Cabinet, 72.6), or a laboratory bench where a person may perform a process by hand with or without standard hand tools.

The material or container may be transported to the work station 202 by a combination of the pick and place robot 206 and the transportation segment 204. As described in more detail below, the transportation segment 204 is configured to move a carrier 211 of material across the module 200 and the pick and place robot 206 is configured to move an element between the transportation segment 204 and the work station 202. When the carrier 211 is located at one or more positions along the transportation segment 204, the pick and place robot 206 moves the carrier, or an item on the carrier, from the transportation segment 204 to the work station 202. In one example, a process on a biological or chemical material is performed at the work station 202. Afterwards, the pick and place robot 206 can move the carrier 211 or the item from the work station 202 back to the transportation segment 204 and the carrier 211 can be moved along the transportation segment 204 to another transportation segment.

The module 200 also includes a transportation segment 204 that is configured to be linked with other transportation segments in order to create a modular transportation pathway that can transport a carrier of material along all of the linked segments in the pathway. As discussed in further detail below, this enables the transportation segments of multiple modules to be linked together to form a transportation pathway between the multiple modules and for that transportation pathway to be the easily reconfigurable if the modules are reordered or if a module is added to or subtracted from that pathway. For example, referring to FIG. 1A, the transportation segments 104A-104C of modules 100A-100B are linked together to create the transportation pathways 158A and 158B between these modules. In the first configuration 156A, module 100B may be removed by disconnecting its transportation segment 1004B from the other modules, and the transportation segments 104A and 104C of modules 100A and 100C can be linked directly to each other to close the gap in the transportation pathway 158A.

The transportation segment 204 is therefore configured to move a carrier of material along the segment and between an adjacent transportation segment. Some example transportation segments that are configured to physically move the carrier include a conveyor belt, a magnetic conveyor belt that has magnets on the conveyor, powered rollers, and a cable car arrangement. Some powered rollers may have rollers oriented at different angles from each other to move the carrier in multiple directions in a single plane, such as a 2-dimensional conveyor that has two powered rollers oriented orthogonally to each other. Other transportation segments may use magnetism to propel a carrier, including a beltless magnetic conveyor that has a non-magnetic outer surface and moving magnets underneath the non-magnetic outer surface, and a magnetic track that can propel a carrier when a current is applied to the magnets. For instance, the carrier may include one or more magnets with north poles facing out at one end and one or more magnets with south poles facing out at the other end; when this carrier is positioned on a track that may be magnetized by applying an alternating current to a coil on the track, the carrier is caused to move along the track and also possibly levitated by the track. The transportation segment 204 in FIG. 2 is a track segment that is configured to move a carrier along the segment using magnetism, for instance.

The above-described transportation segments are active transportation segments in that they can cause a carrier to move. In some other embodiments, the transportation segment may be passive. A passive carrier does not cause the carrier to move, but enables its movement. Examples of passive transportation segments include tracks that may enable a powered carrier to move along the track like a railroad, or a flat surface that may enable a powered, mobile carrier to move along the surface using treads or wheels. A transportation segment may also include guides or markers configured to be detectable by a sensor on a carrier so that the carrier can move along the transportation segment using the guides or markers.

The transportation segment 204 is configured to be linked with other transportation segments so that the carrier of material can be moved between the linked transportation segments. In some embodiments, the transportation segment 204 is configured to be connected to another transportation segment. For instance, the transportation segment 204 of FIG. 2 is configured to be positioned adjacent to, in direct contact with, and secured to a second transportation segment. A first transportation segment may be in direct contact with and secured to a second transportation segment using various means, such as clamps, bolts, connectors, clips, plates, and the like. In other embodiments, adjacent transportation segments may be in direct contact without additional securing means.

In some other embodiments, the two transportation segments may be adjacent to each other, but not touching each other, such that a gap exists between the two segments. These two non-touching adjacent transportation segments may be considered linked or connected together if configured to transport a carrier between the two segments. For example, two adjacent conveyor belts may be positioned end to end with a gap between them, such as 2 millimeters, that is small enough that a carrier can be moved from one conveyor to the other without interference by the gap.

In some embodiments, the alignment of the transportation segment within the module enables the transportation segment to be linked with and connectable to another transportation segment. The transportation segment of the module may be positioned in a manner, including its vertical, horizontal, axial, and rotational positioning, that enables the carrier to be moved between the transportation segments. This positioning may, at least in part, be uniform on a plurality of modules. For example, the transportation segment may have a transportation plane that represents a plane through which the carrier travels while it is moved along the transportation segment. The transportation plane may include a centerline along its length that represents a carrier's movement path along the transportation segment, that is visible when viewed from a direction perpendicular to the transportation plane. The transportation segment may be uniformly positioned on each module in the plurality of modules so that all of the transportation planes are parallel to each other and substantially coplanar such that one transportation plane is offset from another transportation plane other in a direction perpendicular to that one transportation plane by, for example, less than 5% or 10% of coplanar. The module is further connectable to other modules such that when a first end of one transportation segment's centerline is positioned adjacent to a first end of another transportation segment's centerline, the carrier can be moved between these two transportation segments.

Figures 3, 4:
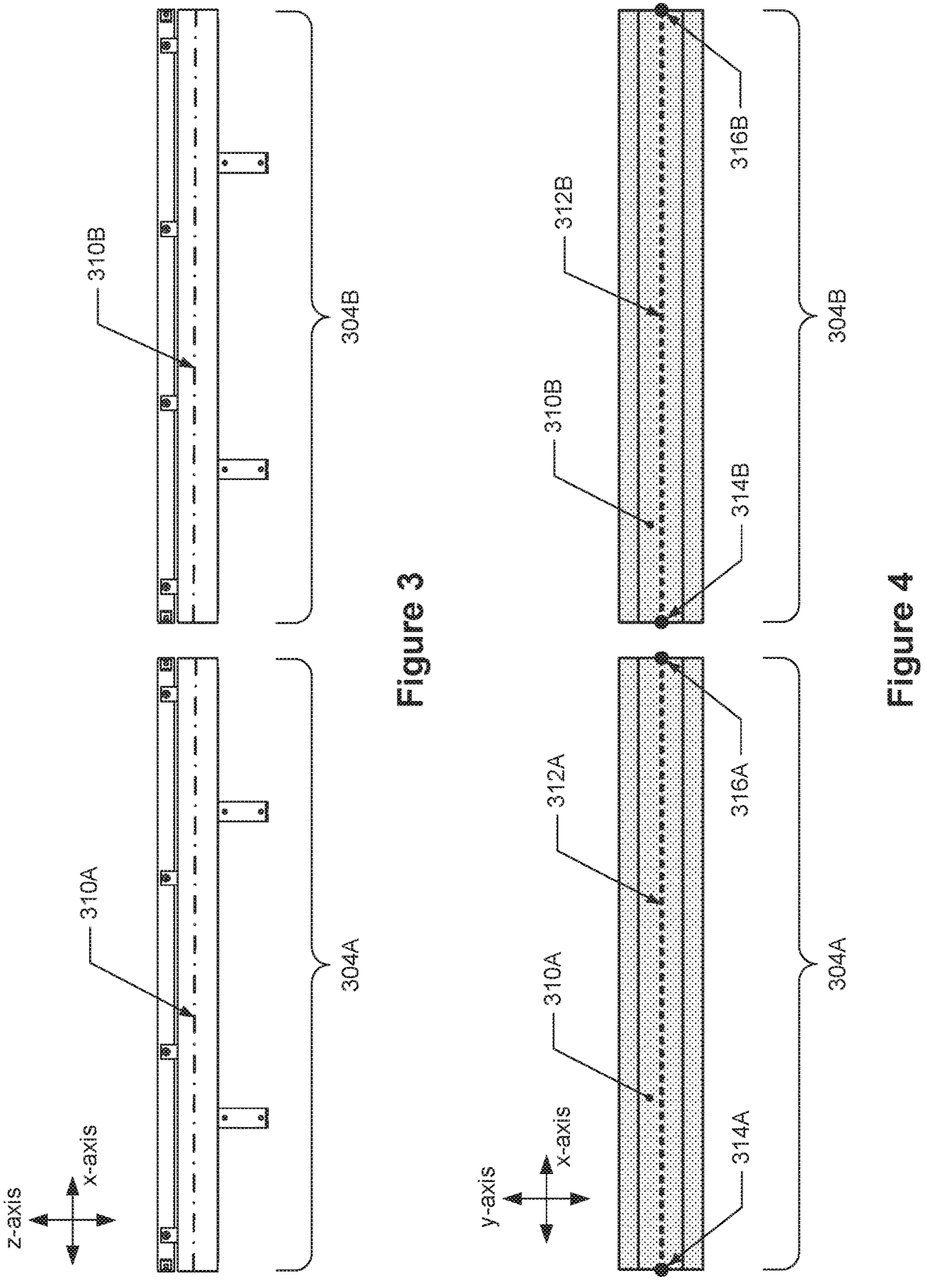
FIG. 3 depicts a side view of two example transportation segments.
FIG. 4 depicts a top view of the two example transportation segments of 3.

Example alignments between adjacent transportation segments are illustrated in FIGS. 3 and 4. FIG. 3 depicts a side view of two example transportation segments. The first transportation segment 304A includes a first transportation plane 310A depicted as a dash-dot-dash line and the second transportation segment 304B includes a second transportation plane transportation plane 3108 also depicted as a dash-dot-dash line; the view of FIG. 3 is along, i.e., parallel to, both the first and second transportation planes 310A and 310B. The carrier is configured to move along the first and second transportation planes 310A and 310B in the x-direction. The first and second transportation planes 310A and 310B in FIG. 3 are parallel to each other, e.g., parallel in the x-axis, and are also substantially coplanar to each other such that they are offset from each other in the z-axis by, for example, less than 5% or 10% of coplanar.

FIG. 4 depicts a top view of the two example transportation segments of 3. This view of FIG. 4 is perpendicular to the transportation planes 310A and 310B of FIG. 3, or along the z-axis, which are depicted in light shading. A first centerline 312A of the first transportation plane 310A is depicted as a dotted line and has a first end 314A and a second end 316A. A second centerline 312B of the second transportation plane 310B is also depicted as a dotted line and has a first end 314B and a second end 316B. These transportation segments 304A and 304B are configured such that when the second end 316A of the first transportation plane 310A is positioned adjacent to, and within a particular distance from, the first end 314B of the second transportation plane 310B, the carrier may also be moveable between these transportation segments. For linear centerlines, such as those depicted in FIG. 4, the transportation segments may be positioned within the module so centerlines of the transportation planes adjacent transportation segments may be collinear with each other, like depicted in FIG. 4.

Other aspects of a transportation segment may be connectable with other transportation segments. For example, for some transportation segments that require power or a communications connection to a network, each transportation segment may have a separate power connection and communications connection that can be directly connected to an adjacent transportation segment. As described above, this enables power and communications to be provided directly to a transportation segment from another module without the use of long continuous cables underneath the transportation segment to connect with a central connection like with traditional assembly lines.

Figures 5, 6:
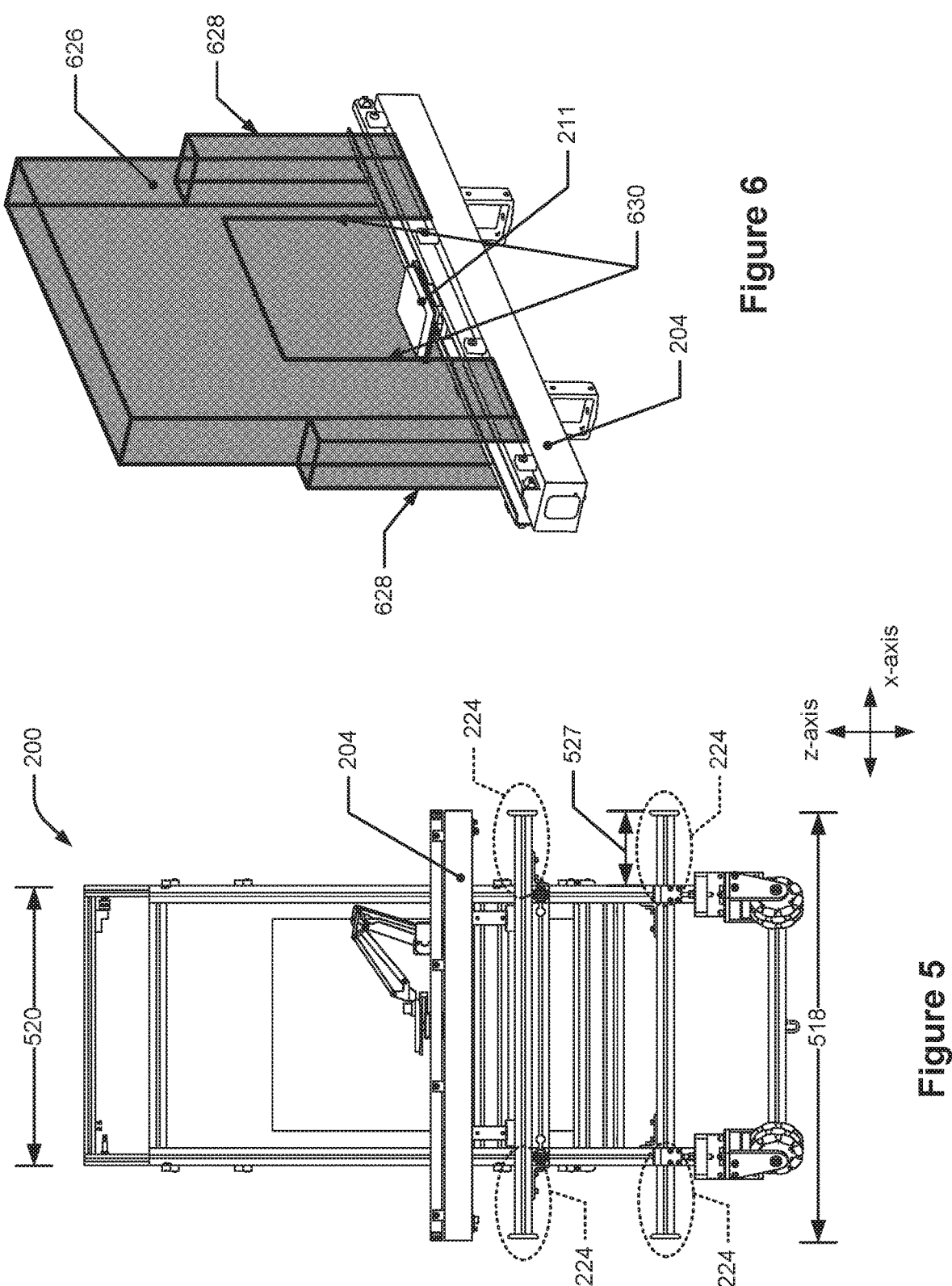
FIG. 5 depicts a front view of the module of FIG. 2.
FIG. 6 depicts an isometric view of the transportation segment of FIG. 2 with a tunnel.

The transportation segment 204 may also be sized and positioned so that it spans across the module 200 thereby enabling the carrier to be moved at least across the module 200. FIG. 5 depicts a front view of the module of FIG. 2 and as can be seen, the transportation segment 204 spans across the module 200 for a first distance 518 which is greater than the first width 520 of the enclosure 209. In these embodiments, the first distance 518 of the transportation segment 204 may be considered the overall width of the module 200.

The carrier configured to be transported or moved on the transportation segment is configured to carry biological or chemical material directly and indirectly. For example, the carrier may be configured to carry a container of biological or chemical material, such as a multi-well plate, a 96-well microtiter plate, a 96 hole 20 uL tip box, and a 384 hole 50 uL tip box, or a plurality of test tubes. This configuration may include a flat surface upon which the container may be placed or slots in which containers may be placed. In some embodiments, the carrier may be configured to receive containers that adhere to the Society for Laboratory Automation and Screening (SLAS), formerly the Society for Biomedical Sciences (SBS), footprint dimensions, which include, for example, a microplate footprint of about 127.76 millimeters by about 85.48 millimeters, with tolerances of about ±0.5 millimeters and about ±0.25 millimeters, for instance. In some other embodiments, the carrier itself may have receptacles for carrying biological or chemical material; for instance, the carrier may itself be a multi-well plate that is configured to be transported by the transportation segment. In some other examples, the carrier may be sized differently than the SBS or SLAS footprints and may still be configured to transport individual tubes, flasks, or other containers. The carrier is also configured such that it is moveable by the transportation segment. This may include having magnets so that it can be moved by a maglev transportation segment, or wheels so it can be moved along a railroad-like track segment. For carriers that are used to transport one or more containers, the carrier may have securement features configured to secure the containers to the carriers, such as side walls, clamps, or magnets that may prevent the containers from falling off the carrier. In some embodiments, the carrier may be made of multiple parts, such as a nest configured to hold a material container attached to a puck configured to be moved along the transportation segment.

As noted above, the carrier may be self-powered. In some such embodiments, the carrier may be a line-following robot that has a propulsion means, such as motorized wheels, and is configured to sense and follow a line or other markers along the transportation segment.

In some embodiments, the module 200 may include a tunnel that at least partially covers the transportation segment 204. The tunnel may seal parts of the transportation segment to prevent the carrier on the transportation segment to be contaminated by air or particles outside the module 200. The length of the tunnel may be less than, greater than, or equal to the length of the transportation segment, and the tunnel may extend around some or all of the transportation segment. The tunnel may have varying heights to allow the carrier to be transported along the transportation segment and to allow the pick and place robot to access and move elements between the transportation segment and the work station.

FIG. 6 depicts an isometric view of the transportation segment 204 of FIG. 2 with a tunnel 626. Here, the tunnel 626 is depicted with dark shading, extends around some of the transportation segment 204, and has a length less than the length of the transportation segment 204. The tunnel 626 includes openings 628 on each end to allow the carrier 211 to travel into and out of the tunnel 626; it also includes an access port 630 that allows a pick and place robot access to the carrier 211 on the transportation segment 204 and transport items between the work station and the transportation segment 204. The tunnel may be attached directly to the transportation segment 204 or may be attached to other items on the module, such as the enclosure. In some embodiments, the tunnel may be configured to span across the junction of two adjacent transportation segments to cover and seal at least the junction from air and contamination outside the two modules. This tunnel may also be configured to connect and seal with another tunnel which may create a continuous cover of the transportation segments that are connected together.

The module 200 may include other features that enable it to be connectable to other modules. For example, the module may include a bumper connection that extends away from a housing of the module, such as the enclosure, by a horizontal distance and that is configured to connect with a bumper connection, or other feature, of another module. Referring back to FIG. 5, the module 200 includes four bumper connections 224 that are identified within the dotted ellipses. FIG. 2 also depicts these connections, one of which is identified. Each bumper connection 224 is seen extending away from the enclosure 209 by a first horizontal distance 526 in the x-axis; only one distance is labeled but all four bumper connections 224 extend the same distance. The end of each bumper connection 224 farthest from the housing is configured to contact and connect with a part of another module, such as another bumper connection. For example, each bumper connection 224 includes a planar surface in the y-axis that can be connected to the planar surface of another bumper connection and a collar, bolt, clamp, or other connectors can be used to connect and secure the bumper connections together. In some instances, a shim may be positioned in-between the planar surfaces of the two adjacent modules to allow for additional adjustments to the spacing between modules. Other features that enable two modules to be connected together include bolts or screws inserted through holes within a housing of each module, clamps, and plates, for example.

The pick and place robot 206 is configured to pick up an object on the transportation segment 204 and on the work station 202, and to move the object between at least these two locations. The pick and place robot 206 therefore includes the ability to grasp and secure an item and may include an end effector that can grasp an object by mechanical, electromechanical, pneumatic, or vacuum means. The pick and place robot 206 may also have multiple degrees of freedom, such as two, four, six, and more than six degrees of freedom, and may also be a Cartesian robot, a Gantry robot, a cylindrical robot, a spherical robot or polar robot, a Selective Compliance Articulated Robot Arm ("SCARA") robot, and an articulated robot. The pick and place robot 206 may also be configured to physically hold a multi-well plate, or other object, flat during movements which may prevent spills or agitation of material in the multi-well plate or object.

The pick and place robot 206 is configured to repeatedly pick up and deliver an object to and from the transportation segment 204 and the work station 202 between the same locations. Some pick and place robots may use a closed loop control to move between positions which may require fine teaching of the robot, the robot being in the same position on each module, and teaching in a consistent manner. Some robots may be initially self-taught through the use of sensors to "see" and store in a memory objects and positions, and may also use these sensors to find objects and positions during normal operations. However, some such pick and place robots may not be able to correct for inaccurate positioning of the objects it is to pick up and of areas to where it is to deliver the object. Additionally, the fine teaching may be expensive, time-consuming, and require special training; the self-teaching robots may also be too large to fit on a module and may be too expensive for some use.

In some embodiments, the pick and place robot 206 may have a gripper configured to become aligned with a surface to deliver an object to, and pick up the object from, a position. The gripper may include a mount, gripping surfaces, and alignment features, all of which are connected to a frame. The mount is configured to connect the gripper to the pick and place robot and the gripping surfaces are configured to contact and secure an object to be moved. The frame is moveably connected to the mount so that the frame can freely move with respect to the mount. The alignment features are fixed to the frame and are configured to contact alignment surfaces that are located near the position from where the gripper is supposed to deliver or take an object, but which are separate from the pick and place robot. The pick and place robot is configured to move the gripper near the aligning surfaces and to cause the alignment features to contact the aligning surfaces and in turn cause the gripper frame to move with respect to the mount and the pick and place robot. This movement of the gripper may be considered "passive" because the robot is not directly moving the gripper; the movability of the gripper with respect to the mount enables the contact forces between the alignment features and the aligning surfaces to move the gripper. The alignment features and the aligning surfaces are configured such when they are in contact with each other, the gripper is caused to move into a desired, aligned position with respect to the object or the surface on which the object is to be placed. This allows for the gripper to be positioned repeatedly into the same desired position even if the gripper is not initially placed exactly into the desired position.

Figure 7:
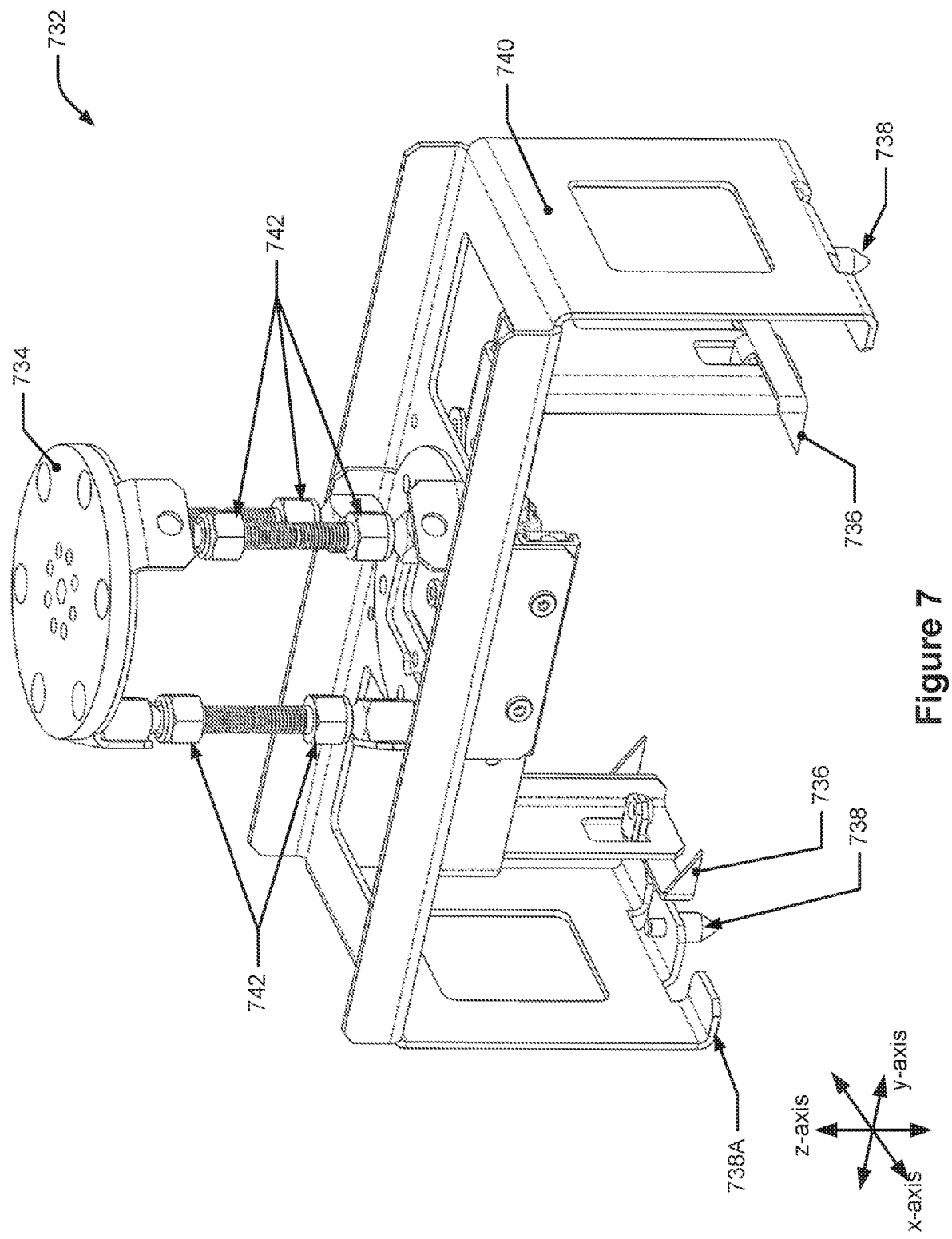
FIG. 7 depicts an isometric view of a first example gripper.

FIG. 7 depicts an isometric view of an example gripper. As can be seen, the gripper 732 includes a mount 734, gripping surfaces 736, and alignment features 738 all attached to a frame 740. The frame 740 is moveably connected to the mount 734 through the use of six ball joints 742 which allow the frame multiple degrees of movement, such as in the x-, y-, and z-linear and rotational directions, with respect to the mount 734. These six ball joints 742 may be considered a compliance mechanism that is a flexible mechanism that transfers an input for and displacement at one location to an output force and displacement at another location through movement or deformation. These ball joints 742 are non-limiting examples and the movement of the frame in multiple degrees of freedom may be accomplished with springs, magnets, or other mechanisms. For instance, the frame may be connected to the robotic arm using magnets instead of the ball joints 742 which may still allow for some freedom of movement as well as the frame to disconnect from the arm if too much force is exerted on either element, thereby providing a safety measure to the robotic arm. The alignment features 738 are rigidly connected to the frame 740 such that when the mount 734 is in a fixed position and a physical force is applied to one or more of the alignment features 738, the frame 740 is caused to move with respect to the mount 734.

Figure 8A:
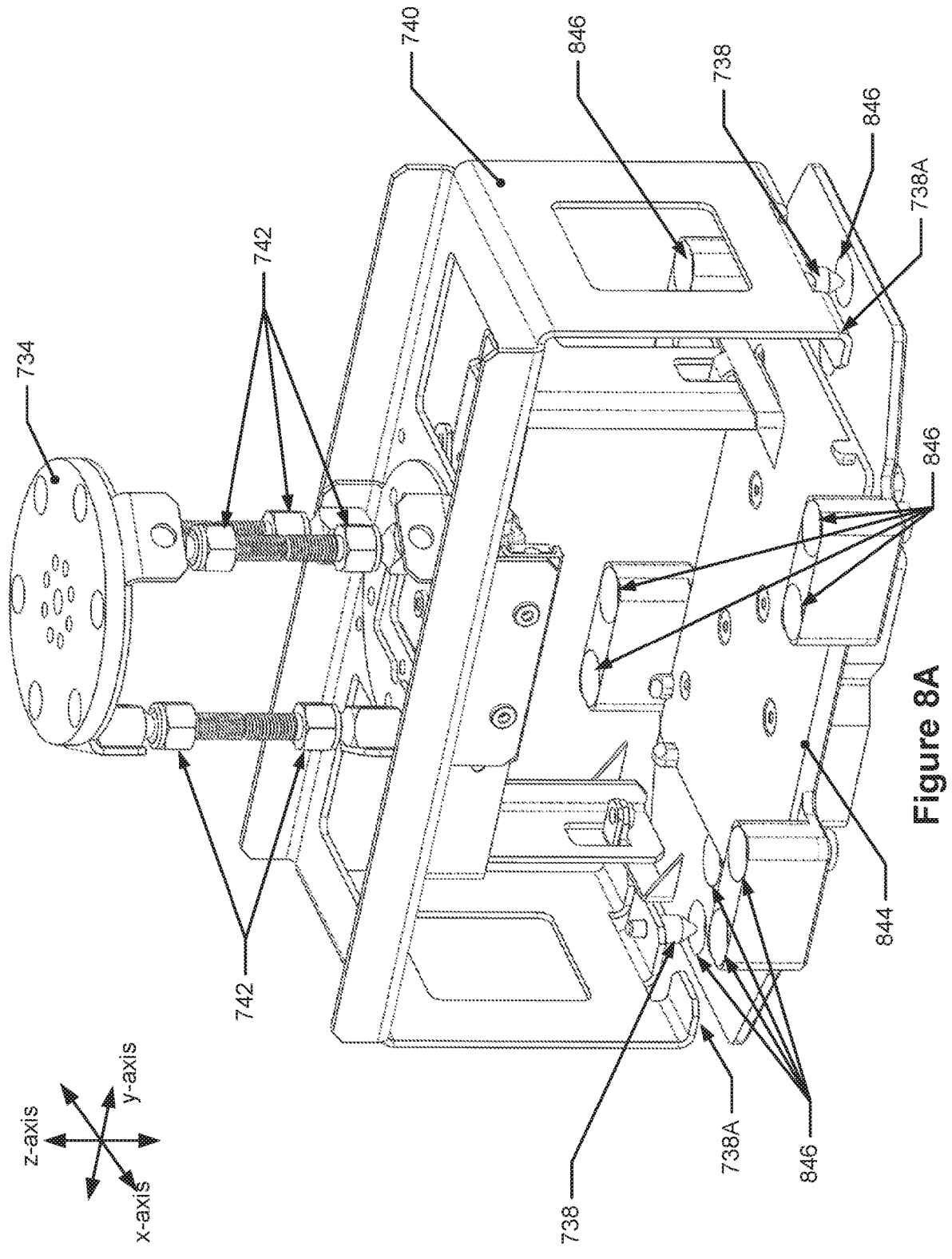
FIGS. 8A and 8B depict an off-angle view of the first example gripper of FIG. 7 with an example positioning surface.
Figure 8B:
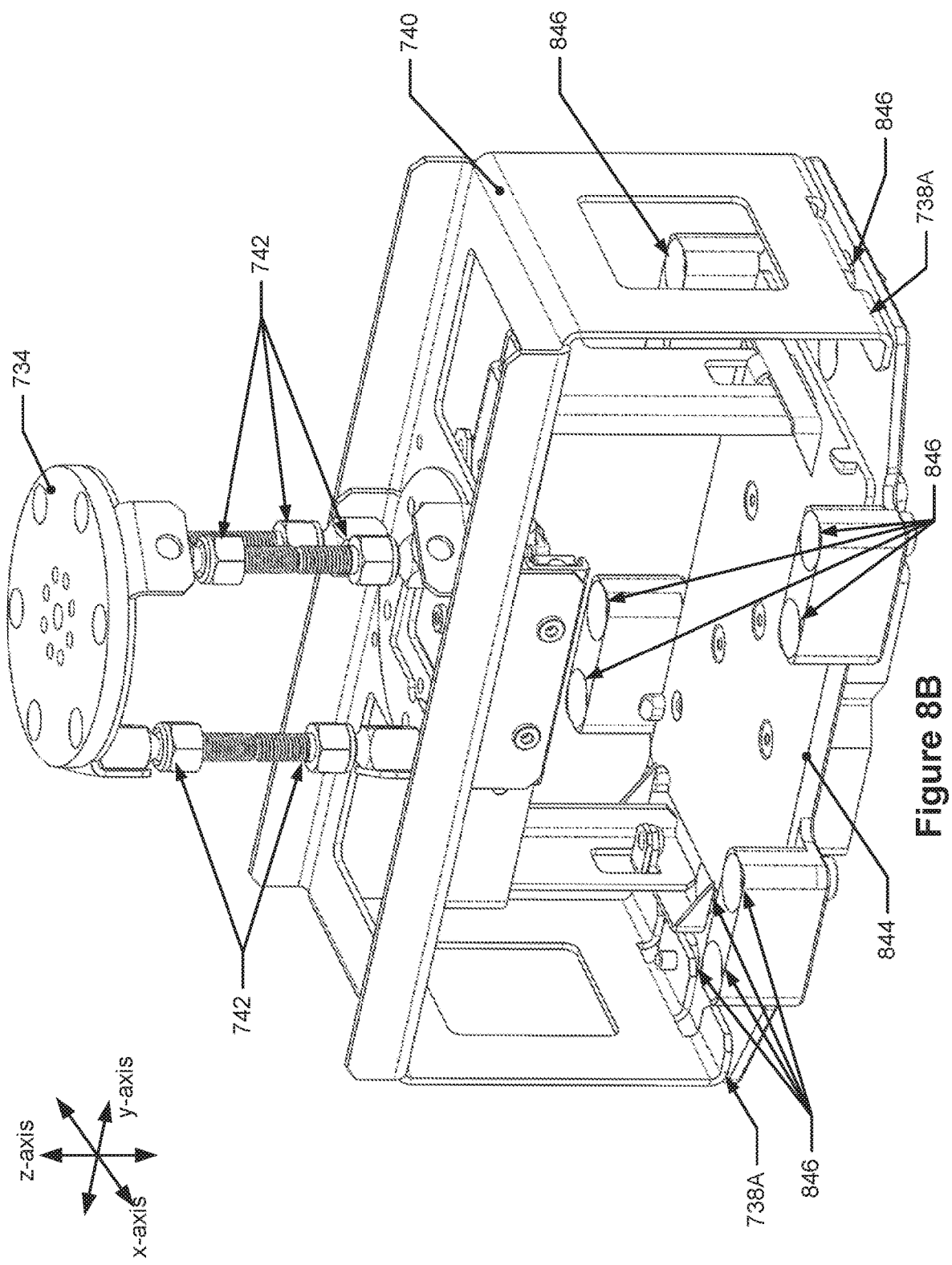

FIGS. 8A and 8B depict an off-angle view of the example gripper of FIG. 7 with an example positioning surface. In FIG. 8A, the gripper 732 is seen above an example positioning surface 844 that includes numerous aligning surfaces, holes 846; in FIG. 8B, the gripper is seen connected to the example positioning surface 844. The aligning surfaces 846 and the alignment features 738 are configured to interact with each other such that they may contact each other and in turn cause the frame 740 to move and to be positioned in the desired, aligned position. For instance, the aligning surfaces 846 are tapered holes and the alignment features 738 are tapered pins (see FIG. 7) that are configured to be able to contact and fit within the holes 846. There are also alignment features that enable the vertical, or z-direction, alignment of the gripper 732. For instance, flaps 738A are alignment features that are configured to prevent or stop the vertical movement of the gripper when the flaps 738A contact the example positioning surface 844.

Figure 17:
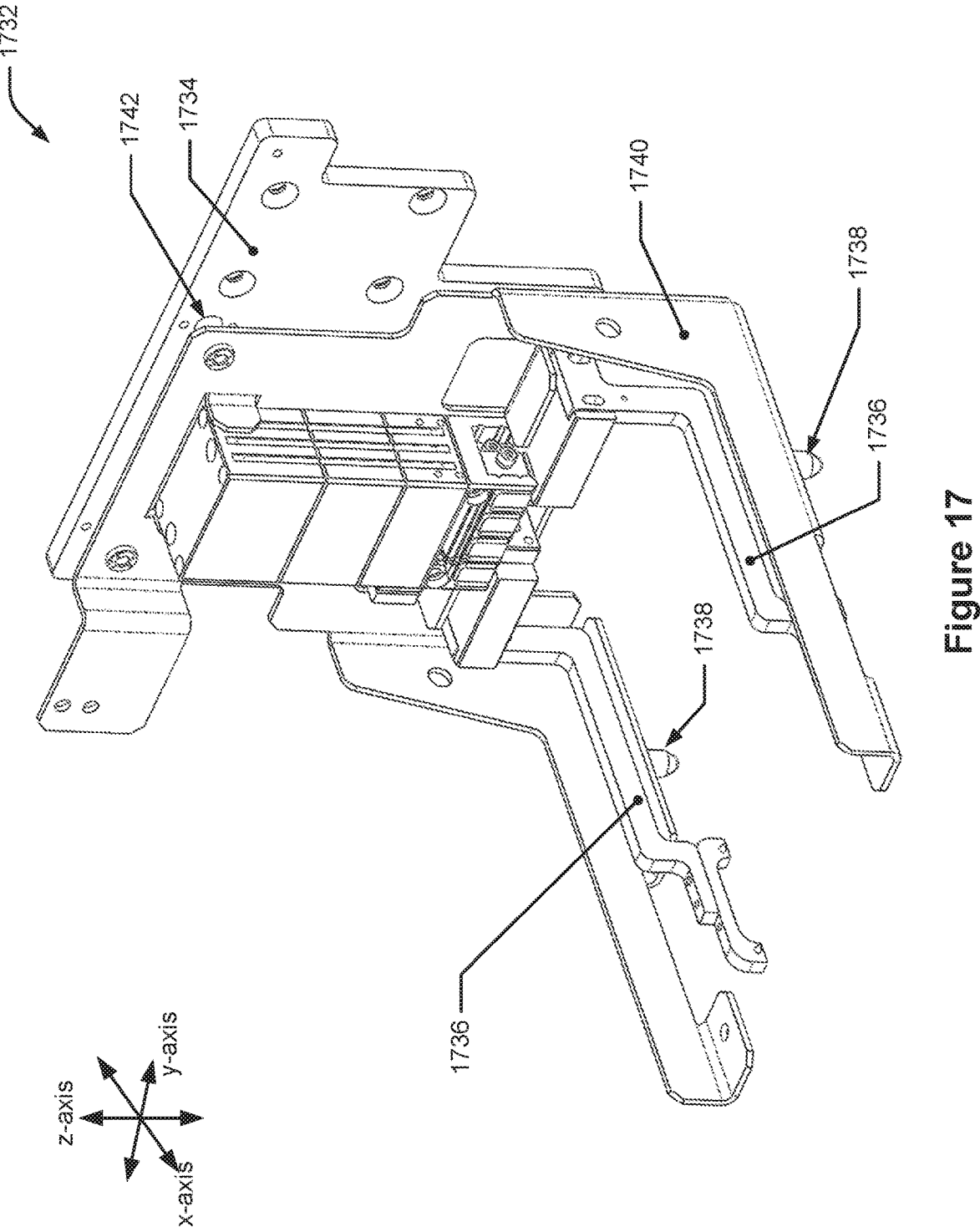
FIG. 17 depicts an isometric view of a second example gripper.

FIG. 17 depicts an isometric view of a second example gripper. Similar to FIG. 7, the gripper 1732 includes a mount 1734, gripping surfaces 1736, and alignment features 1738 all attached to a frame 1740. The frame 1740 is moveably connected to the mount 1734 through a different compliance mechanism 1742, such as compliant rubber bushings, which allows the frame 1740 multiple degrees of movement, such as in the x-, y-, and z-linear and rotational directions, with respect to the mount 1734. Like above, this flexible mechanism transfers an input for and displacement at one location to an output force and displacement at another location through movement or deformation. The alignment features 1738 are again rigidly connected to the frame 1740 such that when the mount 1734 is in a fixed position and a physical force is applied to one or more of the alignment features 1738, the frame 1740 is caused to move with respect to the mount 1734.

Figure 18:
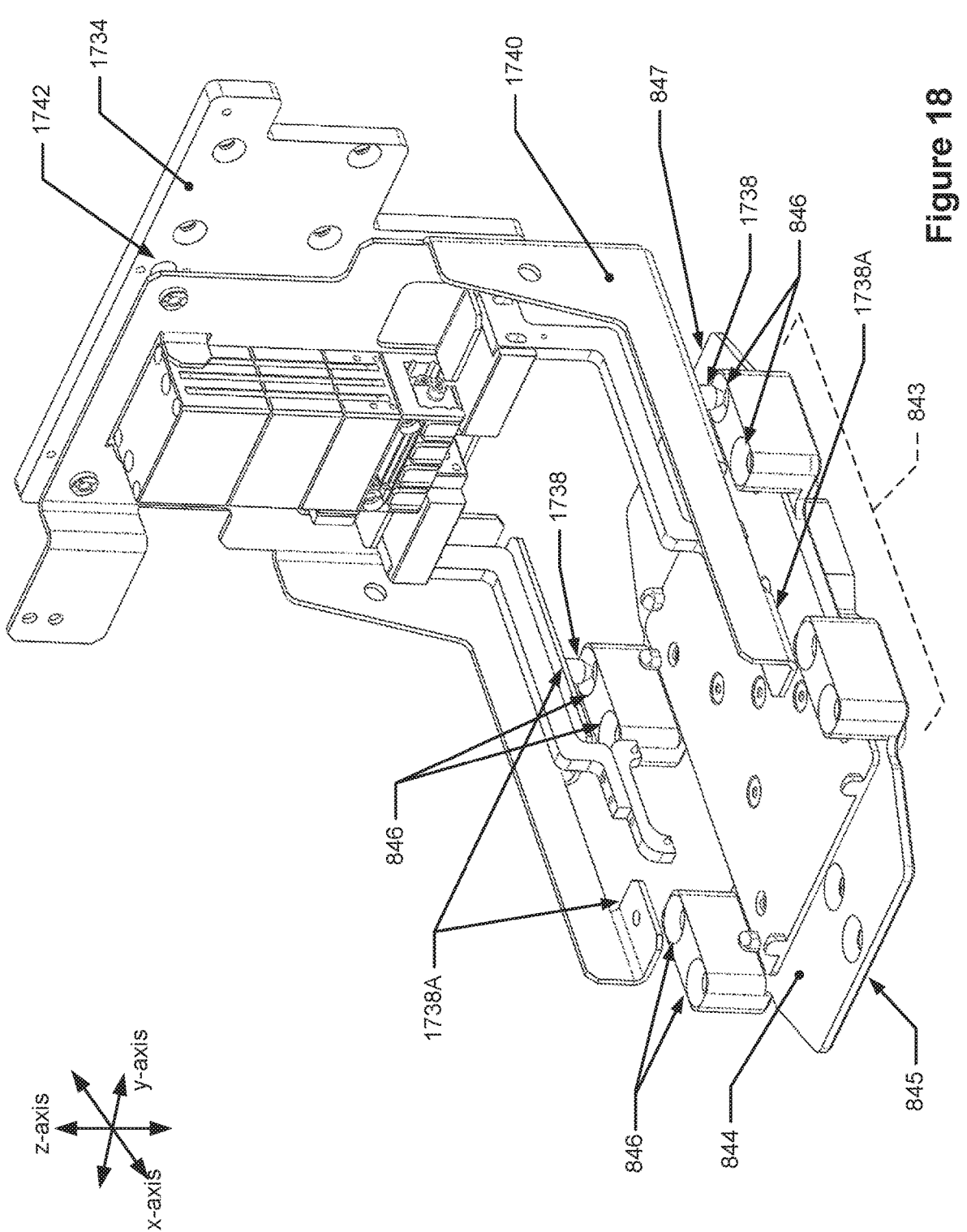
FIG. 18 is an off-angle view of the second example gripper of FIG. 17 with the example positioning surface.

FIG. 18 depicts an off-angle view of the second example gripper of FIG. 17 with the example positioning surface of FIGS. 8A and 8B. In FIG. 18 the gripper 1732 is seen above the example positioning surface 844 of FIGS. 8A and 8B which includes multiple aligning surfaces, holes 846. The aligning surfaces 846 and the alignment features 1738 of the second example gripper 1732 are configured to interact with each other such that they may contact each other and in turn cause the frame 1740 to move and to be positioned in the desired, aligned position. The holes 846 identified in FIG. 18 may be considered positioned on the sides of the positioning surface 844, which may be the sides (one of which is identified as 843) of the carrier; the carrier may also have a first end 845 and a second end 847 which may be front or back ends in some instances or may be multi-directional ends. As seen in FIGS. 18, 8A, and 8B, the second example gripper 1732 is configured to interact with different aligning surfaces of the example positioning surface 844 than the first example gripper 732. Additionally, flaps 1738A are alignment features similarly configured to prevent or stop the vertical movement of the second example gripper 1732 when the flaps 1738A contact the example positioning surface 844.

The second example gripper of FIGS. 17 and 18 is configured to reach and access an object, such as a multi-well plate, from the side as opposed to from above like the first example gripper 732. This access is enabled, at least in part, by portions of the frame 1740 that extend horizontally away from mount 1734, which may be considered along the x-axis, and by the absence of the frame 1740 above the gripping surfaces 1736 and the area between these gripping surfaces 1736 (i.e., the frame 1740 does not extend over the gripping surfaces 1736 and the area between the gripping surfaces 1736). This second example gripper 1732 may provide additional benefits, such as being able to access and grip one object in a vertical stack of objects without being limited to the vertical clearance of the frame and the stack of objects, and being able to access and clear away from an object with short movements, like short side-to-side and short vertical movements. Additionally, configuring the second example gripper with the alignment features 1738 so that they engage with aligning surfaces 846 on the side of the positioning surface 844 (which may be the sides of the carriage or puck) enables the positioning surface 844 (and the carriage or puck) to be smaller end-to-end which may allow the positioning surface 844 (and the carriage or puck) to move or be moved around tighter turns on a transportation pathway, position more items along the transportation pathway and thus improve throughput, and store more such items because of their small footprint.

Figures 9A, 9B, 9C, 9D:
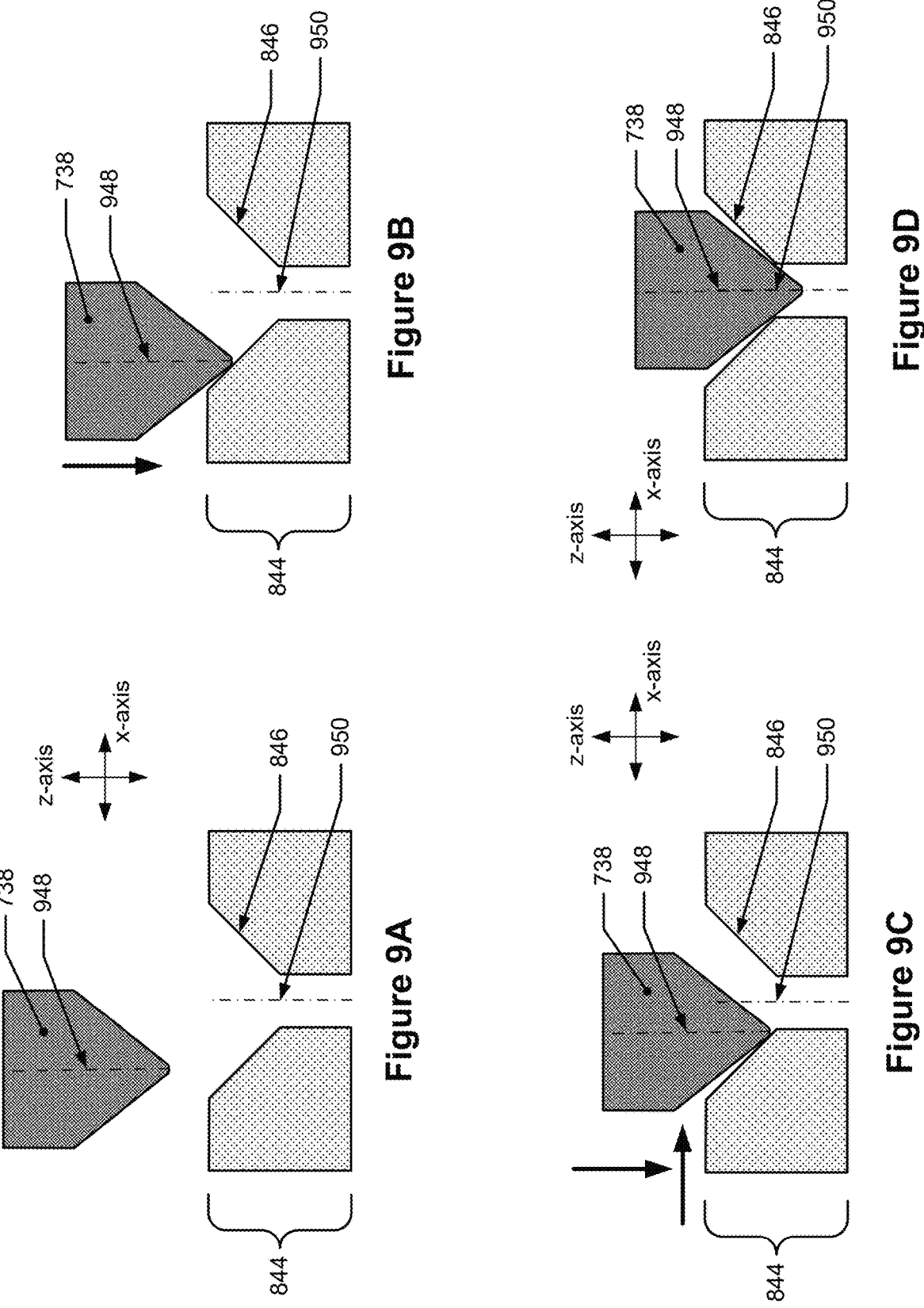
FIGS. 9A to 9D depict an example aligning sequence of the gripper.

FIGS. 9A to 9D depict an example aligning sequence of both the first and second example grippers. These Figures depict example cross-sectional partial views of one alignment feature 738 and 1738 and one aligning surface 846 of FIGS. 8A, 8B, and 18; for efficiency only the features of FIGS. 7, 8A, and 8B are discussed by the sequence of FIGS. 9A through 9D are equally applicable to the second example gripper shown in FIGS. 17 and 18. In FIG. 9A, the pick and place robot has positioned the alignment feature 738 above and close to the aligning surface 846, but not perfectly aligned with the aligning surface 846 such that their centerlines, 948 and 950, respectively, are not collinear in the z-axis and therefore not aligned. Although not shown, this malalignment may be in the x- and y-directions. In FIG. 9B, the pick and place robot has moved gripper with the alignment feature 738 down in the z-direction, as indicated by the heavy arrow, so that the alignment feature 738 contacts the aligning surface 846, but they are still not aligned. As the pick and place robot continues to move the gripper, and therefore alignment feature 738, down in the z-direction, the configuration of the aligning surface 846, the alignment feature 738, and the movability of the gripper, enable the alignment features 738, and thus the gripper, to move in the x-direction, as seen in FIG. 9C, until the alignment feature 738 and the aligning surface 846 are aligned, as seen in FIG. 9D, so that their center axes are collinear. Once this alignment occurs, the gripper is positioned in the desired, aligned position so that it can pick up and deliver an object.

In some embodiments, as seen and described above in FIGS. 7 through 9D, 17, and 18, the alignment of the grippers is based on features that are independent of the object being moved or gripped by the gripper. For example, this alignment is based on the alignment features of the grippers and their interaction with the aligning surfaces of the positioning surface 844 (which includes the carriage or puck); this alignment is not based on the features of a micro-well plate (or other object) that is being picked up or carried by the gripper.

In some embodiments, the gripper may include various sensors. In some instances, these sensors may be configured to determine the presence of a plate or other item on a carrier, such as a plate presence sensor which may be a visual, photoelectric, contact, ultrasonic, magnetic (e.g., inductive proximity sensor), or the like. The gripper may also include a force sensor configured to determine the gripping force applied by the gripper onto an object. In some examples, the force sensor may be a part of the movement mechanism for the gripper itself.

Similarly, in some embodiments the manufacturing module may include other sensors. For example, a module may include environmental sensors configured to detect one or more aspects of the environment in which the module is placed or an aspect of the module, such as temperature, humidity, light, brightness (e.g., a photodiode), pressure (e.g., a piezoresistive strain gauge, capacitive, electromagnetic, optical), and a particulate detector. In other examples, the module may include sensors configured to detect properties of an object on a carrier, or the presence of a carrier, such as a barcode scanner, an orientation sensor (e.g., one or more visual sensors, photoelectric, contact, ultrasonic, magnetic (e.g., inductive proximity sensor), or the like), a plate presence sensor like described above, a weight sensor, a sensor configured to determine a liquid level in one or more containers such as a multi-well plate (e.g., a visual sensor), and a sensor configured to determine whether a seal is on, off, or partially off a container (e.g., a visual sensor).

Figures 10, 11A, 11B:
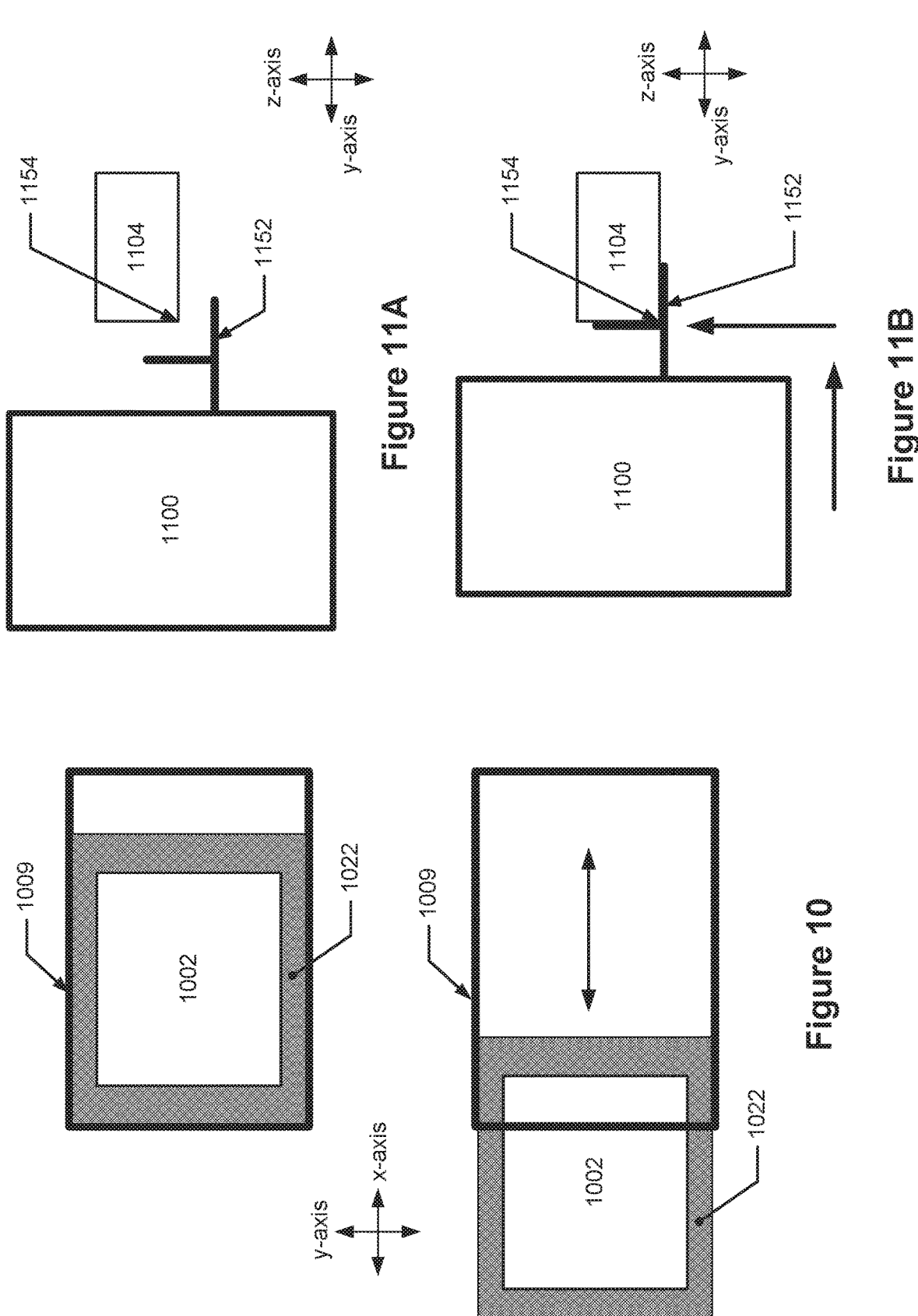
FIG. 10 depicts a top view of two partial representational schematics of the module of FIG. 2.
FIGS. 11A and 11B are representation side views of a module and a separate transportation segment.

In some embodiments, the shelf 222 to which the work station 202 is connected may be moveable between multiple positions in the x-, y-, or z-directions in order to provide access to the work station for servicing, maintenance, or replacement of the work station, for instance. FIG. 10 depicts a top view of two partial representational schematics of the module of FIG. 2. Here, the enclosure 1009, the shelf 1022, and the work station 1002 are representationally depicted with the work station 1002 connected to the shelf 1022 which itself is connected to the enclosure 1009. The shelf 1022 is configured to be movable between a first position, depicted in the top portion of FIG. 10, in which the shelf is fully enclosed by the enclosure 1009 when viewed along the z-axis, and a second position, depicted in the bottom half of FIG. 10, in which the shelf is not fully enclosed by the enclosure 1009. The shelf 1022 may slide or rotate between these positions; in FIG. 10 the shelf is slidable along the x-axis between these positions.

The movement mechanism 208 of the module 200 is configured to allow the work station 202, the transportation segment 204, and the pick and place robot 206 to be moved as a single unit in two or more directions. For instance, referring back to FIG. 2, the movement mechanism 208 includes four omnidirectional wheels and casters that enable the module 200 to be moved in the same plane, which is in both the x- and y-directions of the x-y plane. The movement mechanism 208, along with the transportation segment 204, are connected to the enclosure 209 such that when a force is applied to the enclosure, the movement mechanism allows the module 200 to be moved in the x- and y-directions. Other examples of the movement mechanism 208 include rollers, ball bearings, tracks, treads, or the like. This ability to be moved in the horizontal plane enables modules to be moved together, and arranged and rearranged in various configurations. In some embodiments, the movement may be motorized or mechanized, including using of motorized wheels and powered tracks, for example.

In some embodiments, the movement mechanism 208 may enable the module 200, including the work station 202, the transportation segment 204, and the pick and place robot 206, to be moved as a single unit vertically in the z-direction which may enable vertical alignment of transportation segments. For instance, referring back to FIG. 3, the first and second transportation planes 310A and 310B may be vertically offset from each other by an amount that may prevent or adversely affect movement of the carrier between the two transportation segments 304A and 304B. The ability to adjust a module 200, including its transportation segment, in the vertical z-direction enables the transportation segments 304A and 304B of adjacent modules to be aligned in the vertical direction to allow the carrier to be moved between them.

The module may also include a controller that is configured to control one or more aspects of the module, such as the work station, transportation segment, pick and place robot, and movement mechanism. The controller which may include one or more processors and a memory that may store control logic for causing the transportation segment to move the carrier across the module, cause the pick and place robot to move an element between the transportation segment and the workstation, and cause work station to perform a process on the biological or chemical material or on the material container of the biological or chemical material. The processor may include one or more CPUs, ASICs, general-purpose computer(s) and/or specific purpose computer(s), one or more analog and/or digital input/output connection (s), one or more stepper motor controller board(s), etc. The controller may execute machine-readable system control instructions on processor; the system control instructions, in some implementations, loaded into memory device from mass storage device, and may include instructions for controlling all aspects of the module. System control instructions may be configured in any suitable way and may by implemented in software, in other implementations, the instructions may be implemented in hardware—for example, hard-coded as logic in an ASIC (application specific integrated circuit), or, in other implementations, implemented as a combination of software and hardware. The controller may also be considered a virtual machine which may be a system virtual machine that provides the functionality to execute an operating system, including instructions stored on a memory, and may be a process virtual machine that may execute programs or instructions in a platform-independent environment, which may be in a host operating system. In some instances, one or more of the processor and memory may be a part of a cloud-based server or computing system, that may include one or more processors, memory (such as random-access memory that may be used to store computer-executable instructions during program execution and for temporary data storage), storage (such as hard disk arrays or other non-volatile storage media), and a communications interface (such as a TCP/IP network connection or similar communications interface). In some such instances some or all of the instructions and control logic described herein may be included on the cloud-based server or computing system and each of the modules may be configured to communicate with such cloud-based items (e.g., using a TCP/IP network connection or similar communications interface).

In some embodiments, system control software may include input/output control instructions for controlling the various parameters described above. In some implementations, there may be a user interface associated with the controller. The user interface, which may be included on the module, may include a display screen, graphical software displays of the apparatus and/or process conditions, and user input devices such as pointing devices, keyboards, touch screens, microphones, etc.

The controller, or another controller on the module, may also include instructions for using communications hardware of the module, such as data port or wireless communications interface, to send and receive data with devices outside the module, such as another controller, database, or portal. This enables the controller of the module to receive instructions from and send data to these external devices to monitor and control functions and aspects of the module. For example, a user at a work station in a different floor or building than the module can remotely access, monitor (e.g., determine the status), and control any aspect of the module, such as the work station, and pick and place robot.

In some embodiments, the module may also include enclosing features that are configured to cover aspects of the module, including covering the work station and the pick and place robot. The enclosing features may be connected to the enclosure and may be glass, Plexiglas, or another transparent or semi-transparent material; this connection may also be a moveable connection, like a hinged or sliding door, to enable one or more enclosing feature to be moveable in order to provide access to the covered aspects of the module, like the work station. The enclosing features may be configured to create a sealed space around the covered aspects of the module from areas outside the module. In some embodiments, the module may include a self-contained air and/or air filtration system that can provide filtered air to the sealed space of the module. The module may be configured to create and maintain one or more air pressures within the sealed space that may differ from the pressure outside the module.

Each module may also have one or more utility connections that are each configured to be connected to a connector of a utility. For example, the utility connection may be a utility port or plug receptacle that receives a connection from a utility, such as a power plug or a compressed air line. The utility connections enable the module to receive utilities from a source external to the module. For example the module may include ports or hookups configured to receive power, water, a liquid (e.g., a bleach solution or an ethanol solution for cleaning) gas, ethernet; some more examples include a 110v AC electrical hookup, a RS-232 serial data connection for communication, compressed air, a vacuum connection, and an uninterruptible power supply. The module may not only be able to receive utilities but may also include utility hookups that are configured to provide a utility to one or more elements of the module, such as a power plug in which a power plug from the work station may be plugged.

One or more interfaces may be included on the module, such as a screen, touch screen, buttons, keyboard, mouse, and joystick, for example, all of which may be configured to control one or more features of the module. As described above, this may include controlling the functionality of the work station, the pick and place robot, and the transportation segment. For embodiments that include a motorized movement mechanism, the interface may be configured to control the movement mechanism in or to move the module.

In some different embodiments of the module, the module does not have a transportation segment and is instead configured to be positioned along an external transportation pathway and configured to move, using the pick and place robot, an element between the transportation pathway and the work station. In these embodiments, the module may have one or more of the above-described elements including the work station, enclosure, pick and place robot, and movement mechanism. The transportation pathway is free standing and separate from the module, and may be the same as the transportation segments described above, such as a maglev track or conveyor belt, including a modular pathway. The movement mechanism, at least in part, enables the module to be moved into horizontal and vertical position along the transportation pathway so that the pick and place robot can transfer material between the transportation pathway and the work station. Once the module is in position along the transportation pathway, the robot may be instructed as to the positioning for transferring between the transportation pathway and the work station of the module. This instruction may be manually input by a user, or may be detected and learned by the robot.

In some embodiments, the module may include transportation aligners that are configured to allow the module to be positioned in the correct position with respect to the transportation pathway. For example, the transportation aligners may be physical features that extend away from the module and are configured to contact a horizontal position and a vertical position on the transportation pathway when the module is positioned in the correct position. FIGS. 11A and 11B are representational side views of a module and a separate transportation segment. The module 1100 in FIGS. 11A and 11B is represented as a box; it does not have a transportation segment and is configured to connect with the separate transportation segment 1104 using transportation aligner 1152 that is an L-shaped bracket extending away from the module 1150. This L-shaped bracket 1152 is configured to contact and extend around the corner 1154 of the transportation segment such that when the corner edge is fully in the L-shaped bracket, the module has been moved in a horizontal and vertical direction as indicated by the directional arrows so that it is in the correct position for the pick and place robot (not depicted) to transfer material between the separate transportation segment and the work station (not depicted), like is depicted in FIG. 11B. In some other embodiments, these aligners may be sensors on the module that are configured to detect the module's horizontal and vertical position and in some embodiments, may automatically move and adjust the module into the correct position along the transportation pathway.

Reconfigurable Systems

Examples of various reconfigurable systems are described herein. As described above, some reconfigurable systems include modules that may be repositioned, reordered, and reconnected, added to, or removed, in order to perform various aspects related to the production of products, such as performing a process on a biological or chemical material, housing biological or chemical material, performing a process on a material container, and housing a containing of biological or chemical material.

In some systems, the modules described above are connected together to form a "meta-module." This meta-module is reconfigurable into a plurality of configurations such that the modules may be reordered, modules may be added or removed, and modules may be positioned in different arrangements and shapes. For instance, one configuration may have N modules, another configuration has M modules that are less than N, and a different configuration that has P modules that are greater than N. In each configuration, the modules in the meta-module are moveable as a single unit. Each module may have a movement mechanism such that connected modules can be moved as a single unit. This single unit movement may be caused by human power or the use of equipment to push or pull the meta-module, or it may be by a motorized movement mechanism of one or more modules. As described above, the modules may also be connected to each other in a variety of ways, such as using a connection between two bumper connections of adjacent modules, a connection between the enclosures of two adjacent modules, and a physical connection between transportation segments of adjacent modules.

In some embodiments of a meta-module, each module may have a transportation segment like discussed above and shown in FIG. 2. In these embodiments, all of the transportation segments of the modules in the meta-module may be connected with each other to create a transportation pathway that extends through the plurality of modules in the meta-module and upon which the carrier can be moved.

The reconfigurability of some meta-modules is illustrated in FIGS. 1A and 1B, discussed above. As illustrated, the modules may be added to, removed from, reordered, and repositioned. Additionally, in some such systems, the carrier may be transported to some or all of the modules and to any module in any order. The carrier is not limited to being transported in a single order and to all of the modules. For example, in the third configuration 158C of FIG. 1b, the carrier may be transported in any order to any of the modules, such as first to module 100A, then to the module 100C, then to module 100B, and not to 100D.

A meta-module may also include one or more additional transportation segments in the transportation pathway that are not a part of a module. This additional transportation segment may provide additional space between two adjacent modules, may provide a service gate so that a user may move across the transportation pathway, and may provide a directional routing of the transportation pathway, such as a curve or split. Referring back to FIG. 1A, a spacer transportation segment 160 is seen in between adjacent modules 100C and 100A which provides additional space between modules 100C and 100A.

Figure 12:
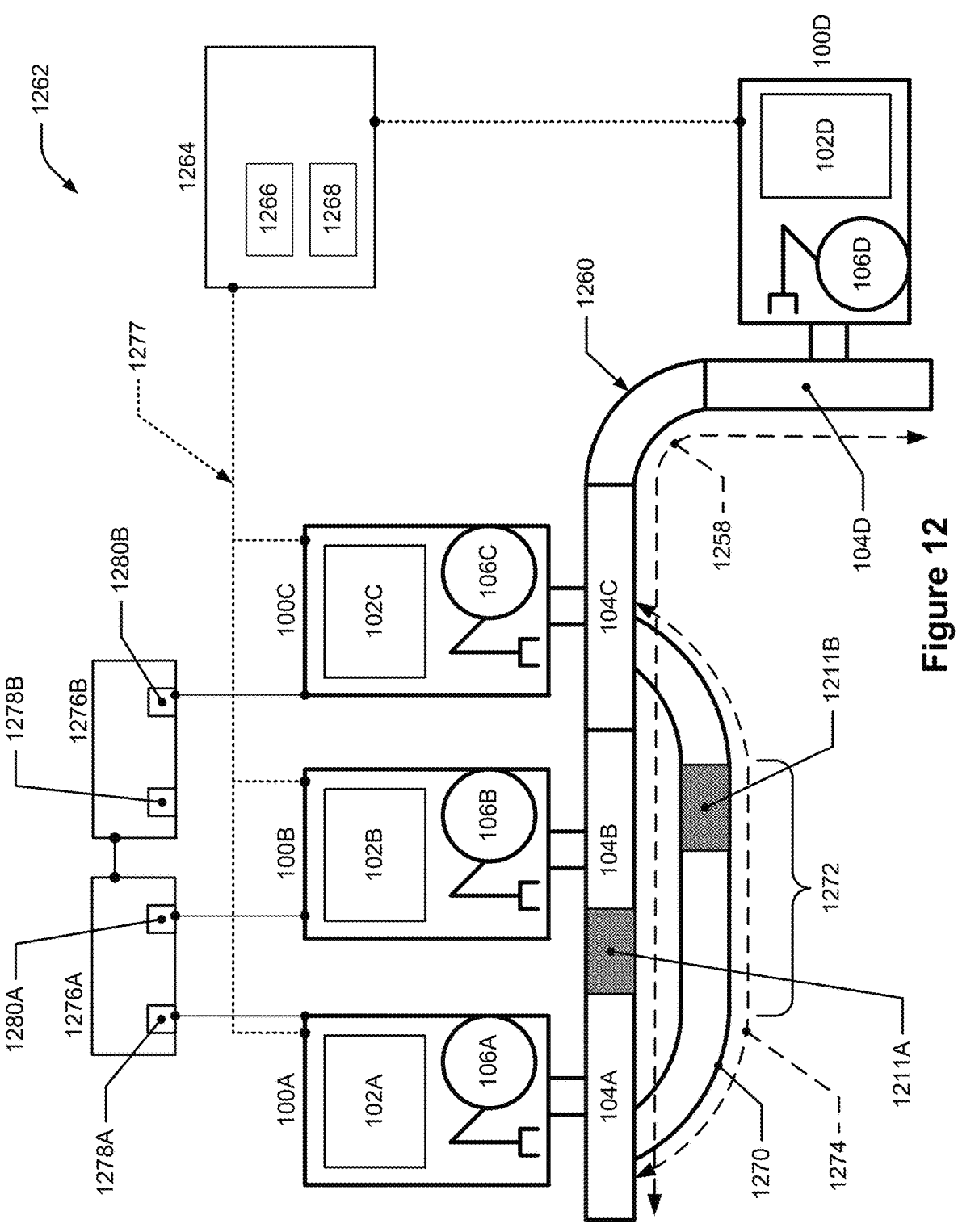
FIG. 12 depicts an example system with a plurality of modules.

FIG. 12 depicts another example system with a plurality of modules. The system 1262 of FIG. 12 includes four modules like those shown in FIGS. 1A and 1B, 100A-100D, which have a work stations 102A-102D, a transportation segment 104A-104D, and a pick and place robot 106A-106D. Similar to above, each module may be configured in any way described herein but include the depicted features for illustration purposes. These four modules may be considered a "meta-module" as described above, meaning that they are connected together, are moveable as a single unit, are reconfigurable into a plurality of configurations such as reordered or having modules added or removed, and create a transportation pathway across all the modules.

The system in FIG. 12 also includes a first carrier 1211A, depicted with dark shading, that may be moved along each of the transportation segments that make-up the transportation pathway 1258, identified with a dashed line, including the spacer transportation segment 1260 which provides a curve in the transportation pathway 1258. In some embodiments, each of the transportation segments of the modules in the system 1262 may be positioned at substantially the same height, as discussed above.

The system 1262 also includes a controller 1264 that has a processor 1266 and a memory 1268 as described above. The controller 1264 may be configured to control any aspect of any module; for example, the controller 1264 is seen communicatively connected to each module 100A-100D as represented by the dotted lines 1277 in FIG. 12, and the memory 1268 may include instructions for causing each of the transportation segments 104A-104D to move the first carrier 1211A across each manufacturing module 100A-100D and along the transportation pathway 1258, causing each pick and place robots 106A-106D to move an element between the transportation segments 104A-104D and the work stations 102A-102D, causing each work station 102A-102D to perform a process on biological or chemical material, to house biological or chemical material, to cause a chemical process to occur on biological or chemical material, to house a material container, or to perform a process on a material container, and causing the first carrier 1211A to be moved between each of the manufacturing modules. The communication connection between the modules 100A-100D, represented by the dotted lines 1277, may be hard wired, wireless, or both. For instance, a wired telecom pathway may be created between the controller, a modular subfloor tile 1276A, and one or more modules, while in another instance the modules may be connected to the controller 1264 wirelessly or directly using wired telecom pathways. The wireless connection may be any wireless connection such as radio signals.

In some embodiments, the system 1262 may include additional transportation segments that may provide alternate and additional pathways for the carrier to be moved. For example, the system 1262 may include one or more parallel transportation segments that are connected to the other transportation segments and are configured to allow the carrier to be moved parallel to the other transportation segments. For instance, the system 1262 of FIG. 12 includes a second transportation section 1270, that includes a portion 1272 parallel to the transportation segment 104B of module 1006, and that is configured to transport the first carrier 1211A in an alternate pathway 1274 to the transportation pathway 1258. This may enable multiple carriers to be moved simultaneously even if one carrier is stopped or moving in a different direction along the transportation pathway. For example, if the first carrier 1211A is stopped in its depicted position, a second carrier 1211B may be moved around it to module 100A, 100C, or 100D.

The system may, in some instances, be configured to allow the carrier to move between the transportation segments and the second transportation section using a railroad type switch. In these instances, the transportation segments 104 and the second transportation section are tracks, such as maglev or rails, and a first switch is connected to both the transportation segment and the second transportation section. The first switch may include a section of straight track (e.g., the transportation segment), a section a curved track (e.g., the second transportation section), and moveable switch points interposed between diverging outer rails (e.g., stock rails) configured to divert traffic between each section of track.

In some embodiments, the system may include a modular subfloor tile that includes one or more utilities to which one or more modules may connect. The modular subfloor tile is moveable so that it can be positioned near one or more modules to provide one or more close utility connections or ports and repositioned if the modules are reconfigured or moved. The modular subfloor tile is also configured to be connectable to other modular subfloor tiles such that adjacent modules can be physically connected to each other and the utilities of each module may be connected to each other. For example, the modular subfloor tile may have four electrical ports to which a module may connect, and it may also include an electrical port on a side that may be used to connect, such as with a jumper cable, to an electrical port on the side of an adjacent modular subfloor tile. In some embodiments, one side of the modular subfloor tile may have female connections and ports of its utilities, and the opposite side may include male connection and ports such that when the opposite sides of two adjacent modular subfloor tiles are physically connected, their respective male and female connections become connected. The utilities provided by the modular subfloor tile may include one or more of each of the following, an electrical connection, an ethernet port, a compressed air connection, a gas connection, a liquid port (e.g., for provide water, or another liquid, such as a bleach solution or ethanol solution for cleaning), a vacuum connection, and an uninterruptible power supply. For example, the modular subfloor may have four electrical connections and six gas connections.

Modular subfloor tiles 1276A and 1276B are seen in FIG. 12 and each includes a first utility connection 1278A and B, respectively, and a second utility connection 1288A and B, respectively. These connections may also be considered a utility port which is a location on the modular subfloor tile where a utility on the module may be connected. The first utility connection 1278A of modular subfloor tile 1276A is seen connected to the module 100A, the second utility connection 1280A of modular subfloor tile 1276A is connected to module 100B, and the second utility connection 1280B of modular subfloor tile 1276B is connected to module 100C in order to provide utilities to these three modules. If modules 100A, 100B, and 100C were moved to a different location, then the modular subfloor tiles 1276A and 1276B may also be moved to that same location; additionally, if these modules were reconfigured by being reordered, the modular subfloor tiles 1276A and 1276B could also be reordered or moved in order to provide utilities to the reconfigured modules.

The linear connection between the modular subfloor tiles 1276A and 1276B is representative of the physical and utility connection that is possible between each other. This direct connection between adjacent modular subfloor tiles limits the conduit and cables that may be run to the modules in order to provide utilities to the modules. For instance, a utility connection provided by a building, such as a power outlet on a wall, may be connected to a single modular subfloor tile that is electrically connected to multiple adjacent modular subfloor tiles thereby providing power to all of those modular subfloor tiles with a single electrical connection to the wall outlet. Modules may then electrically connect to a modular subfloor tile in close proximity to those modules, such as within a few feet, instead of running multiple, long electrical cables from the wall outlet to each module.

In some embodiments, the modular tile may instead be a modular moveable cart. This modular moveable cart may include any and all of the features of the modular tile and it is configured to be moveable, such as with a movement mechanism like described herein (e.g., wheels, tracks). It may also have a frame to which items may be connected and positioned, such as hook-ups and female connection points for utilities. Furthermore, the modular tile depicted in the Figures and described above may be interchanged to be a modular moveable cart. In some instances, the modular moveable cart is configured to be physically connected to a manufacturing module like another manufacturing module, such as by having, for instance, a transportation segment and connection mechanism like described herein with the manufacturing modules (e.g., a bumper connection). In some such embodiments, the modular movable cart may be a part of a meta module and moved together with other manufacturing modules. For example, referring to FIG. 12, module 100C may be a modular moveable cart that has a transportation segment and does not have a pick and place robot or a work station 102C; similarly in FIG. 13A, the module 1300C may be a modular moveable cart that does not have a transportation segment.

In some embodiments, a system may include an external transportation pathway and a plurality of the modules that do not have their own transportation segment but instead are configured to be positioned along the transportation pathway in a variety of configurations. These modules may be considered those discussed above, including with respect to FIGS. 11A and 11B. In some implementations of this system, the transportation pathway is free standing and separate from the modules. The transportation pathway may be any of those described above, such as a single, continuous transportation segment like a conveyor belt, or a segmented, modular pathway that is made up of multiple segments connected together. For example, a plurality of maglev track segments may be physically connected together and supported off of a floor with vertical support legs, or suspended from the ceiling. Once in position, the plurality of modules that do not have a transportation segment are moved, either individually or together, horizontally, vertically, or both so that the pick and place robot can transfer material between the transportation pathway and the work station of each module. As described above, the module or the transportation pathway may have transportation aligners that are configured to allow the module to be positioned in the correct position with respect to the transportation pathway.

In some embodiments of this system, the modules are reconfigurable into a plurality of configurations along the transportation pathway. This reconfigurability includes the modules being reordered along the transportation pathway as well as modules being added or removed from the transportation pathway. Additionally, the transportation pathway is configured to be repositioned and reconfigured into a different shape or to travel a different path, and the modules are configured to be moved and repositioned along the augmented transportation pathway.

Figure 13A:
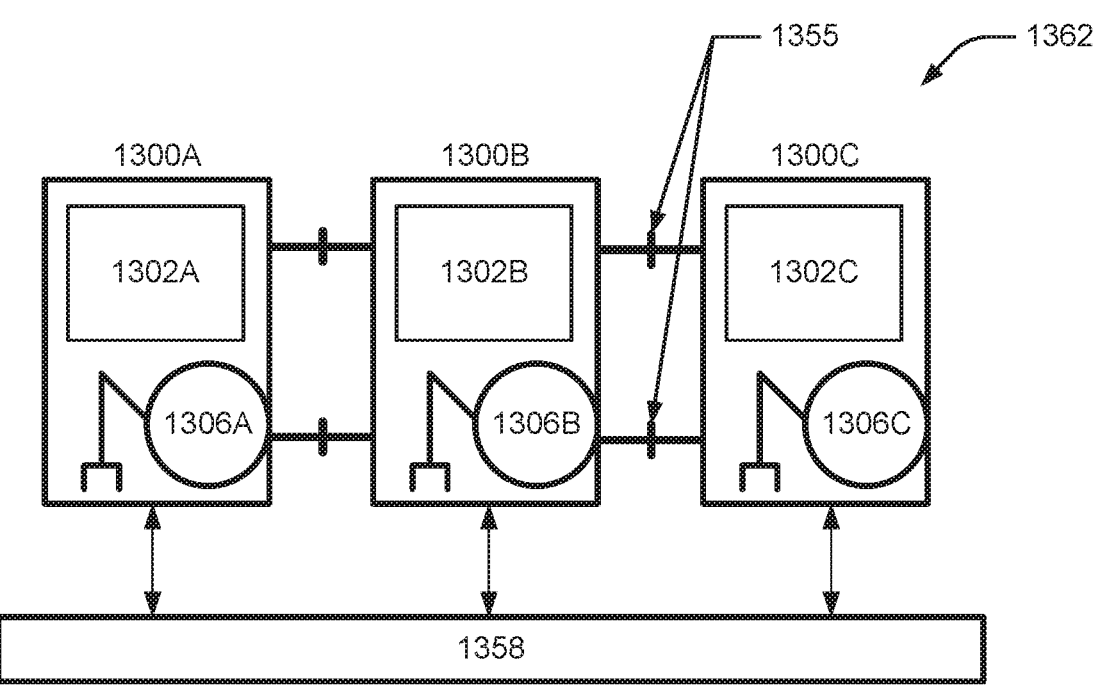
FIGS. 13A-13C depict an example system having an external transportation pathway and a plurality of the modules that do not have their own transportation segment.
Figure 13B:
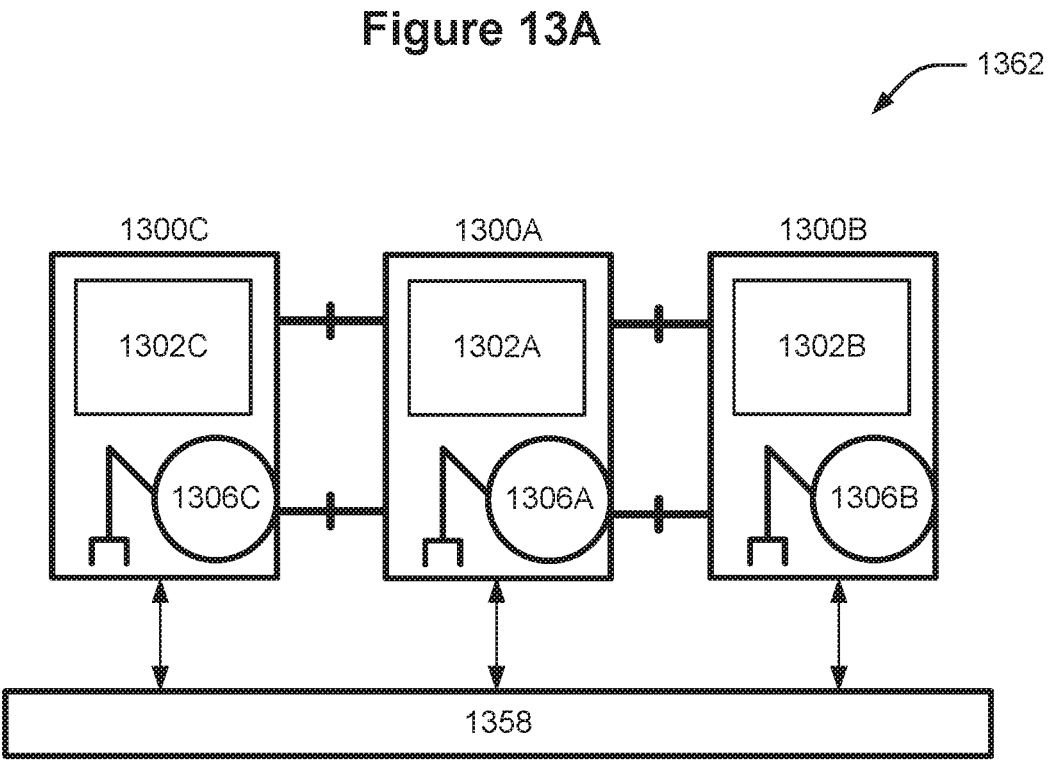
Figure 13C:
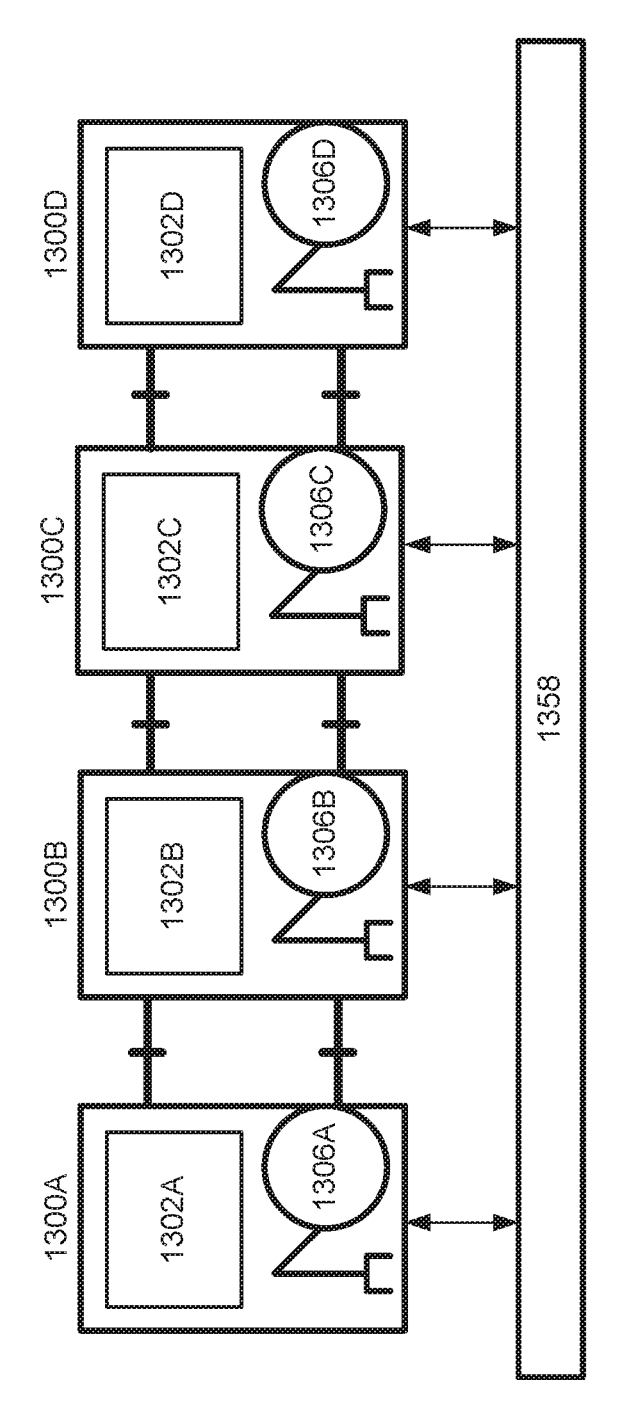

FIGS. 13A-13C depict an example system having an external transportation pathway and a plurality of the modules that do not have their own transportation segment. FIG. 13A includes three modules 1300A, 1300B, and 1300C similar to those modules in FIGS. 1A and 1B except that each of these modules do not have their own transportation segment. The transportation pathway 1358 in FIGS. 13A-13C is not a part of the modules and is instead a separate, standalone feature of the system and extends for a distance greater than the width of all the modules. As indicated by the double sided arrows, each of the modules are configured to be moved and positioned along the transportation pathway such that the pick and place robots 1306A-1306D are able to transport an element between the transportation pathway 1358 and the work stations 1302A-1302D. The modules in these figures are depicted connected together representing that they may be moved as a single unit to the transportation pathway 1358 and that they may be connected together as a single unit once positioned along the transportation pathway 1358. FIGS. 13B and 13C illustrate that the modules 1300A, 1300B, and 1300C may be reordered, that modules may be added to or removed from the transportation pathway 1358, and that the transportation pathway 1358 may be modified, such as lengthened.

In some other embodiments, a system may include a transportation pathway, a pick and place robot, and plurality of modules that are positioned around the pick and place robot. The modules may be configured in any manner as described above, such as its mobility with the movement mechanism, except that they each do not have their own pick and place robot or transportation segment. The pick and place robot is configured to transport an element between any of the modules and between any module and the transportation pathway. The modules may be reconfigured around the pick and place robot, such as being reordered or having one or more modules removed or added. The modules may also be connected together and moved as a single unit with respect to the pick and place robot. In some embodiments, the pick and place robot may be configured to be moveable, such as having a movement mechanism described above, and connectable to the modules such that all of the modules and the pick and place robot may be moved together as a single unit, or separately, with respect to the transportation pathway.

Figure 14:
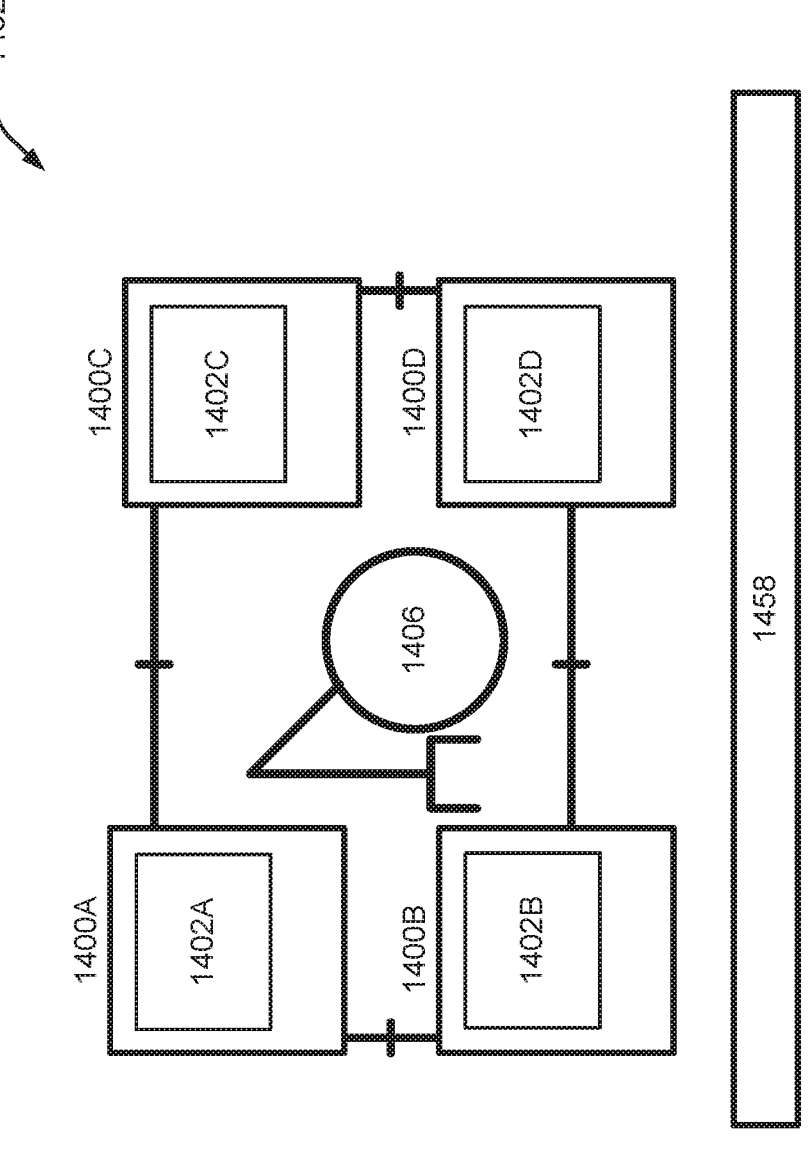
FIG. 14 depicts an example system that has a transportation pathway, a pick and place robot, and plurality of modules that are positioned around the pick and place robot.

FIG. 14 depicts an example system that has a transportation pathway, a pick and place robot, and plurality of modules that are positioned around the pick and place robot. As can be seen, similar to FIGS. 13A-13C, the transportation pathway 1458 is separate from the modules 14 and from the pick and place robot 1406; this robot is also a separate element from the modules. Here, the four modules 1400A, 14006, 1400C, and 1400D each have a work station 1402A-1402D, but do not have a transportation segment or pick and place robot. They are connected to each other and positioned around the pick and place robot 1406 which is configured to move an element between the transportation pathway 1458 and the modules, as well as between modules. The pick and place robot 1406 may be similar to those described above, but larger in size so that it can reach each of the work stations 202A-202D in the modules. The modules 1400A, 14006, 1400C, and 1400D are seen connected to each other, but they can be disconnected from each other, repositioned, moved, and reconfigured. For instance, module 1400B may be removed, another module may replace module 14006, another module may be added, and the modules may be reordered. In some embodiments, the system may have more than one pick and place robot which may be configured to transport elements between modules, but not between modules and the transportation pathway.

In some embodiments, the transportation segment may be included in one of the modules. For instance, the transportation pathway 1458 may be a part of only module 14006, and not an element of the other modules.

Although not depicted in system FIGS. 13A-14, these systems described herein may include features of some of the other systems, such as a controller and modular subfloor tile. For instance, the controller described above with respect to FIG. 12 may be a part of the systems of FIGS. 13A-14 and configured to control any aspect of these systems, such as the transportation system, modules, and pick and place robots.

Figure 15:
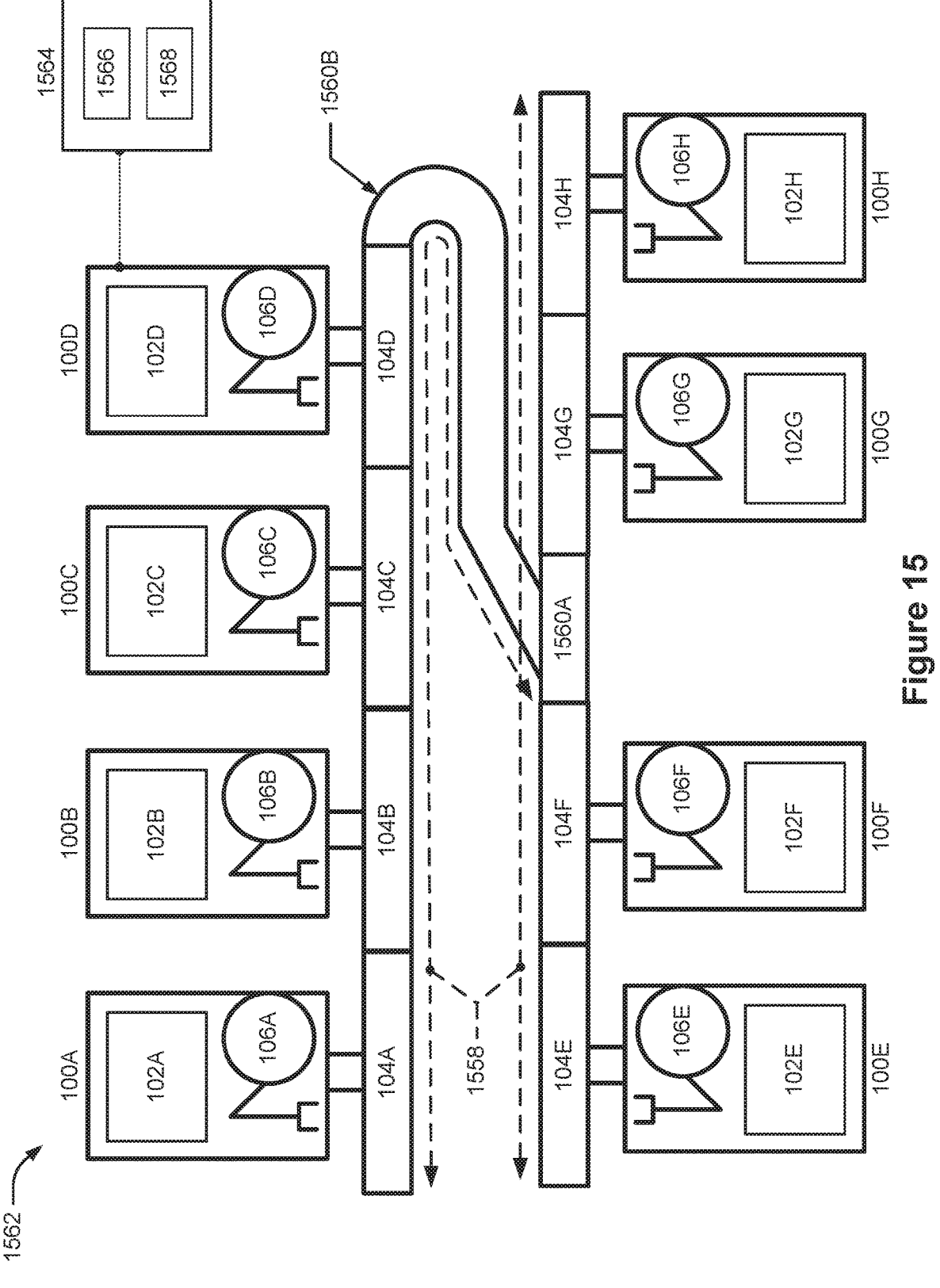
FIG. 15 depicts one example configuration of a system configured to perform processes related to biological or chemical material.
Figure 16:
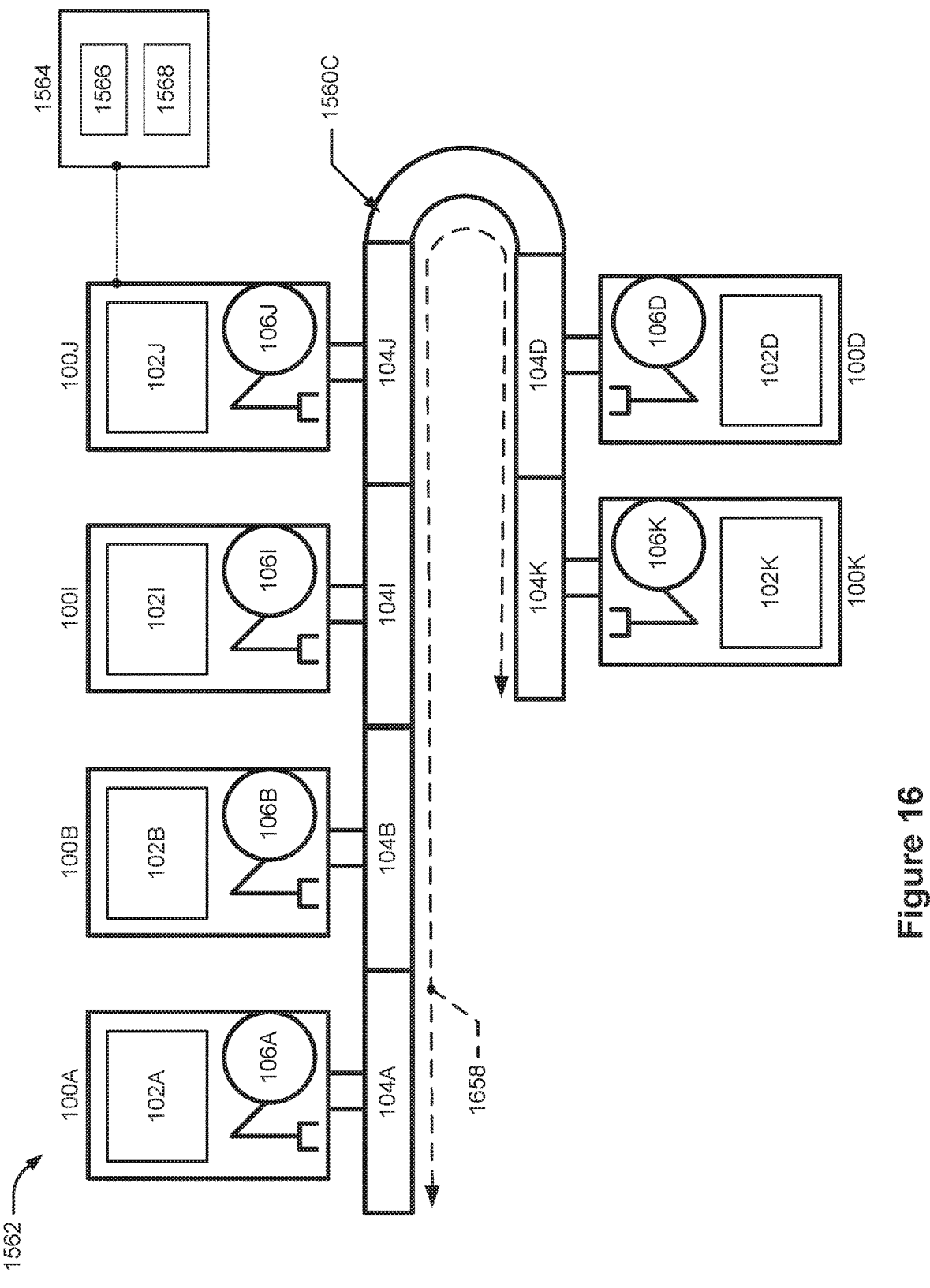
FIG. 16 depicts a second configuration of the system of FIG. 15.

Some systems may be configured to perform various biological or chemical processes, as seen in example FIGS. 15 and 16. For example, these systems may include modules with work stations that are configured to perform aspects related to biological or chemical processing, such as the replication of DNA or RNA, sometimes referred to as primer amplification, and reconfigurable to perform other aspects related to biological or chemical processing. FIG. 15 depicts one example configuration of a system 1562 configured to perform processes related to biological or chemical material. A carrier, not depicted, may be configured to carry a multi-well plate and be transported along transportation pathway 1558 that is identified with dashed lines and includes transportation segments 1504A-1504H and 1560A and 15606. Each module 100A-100H, like described above, is configured to transport the multi-well plate from the carrier on a transportation segment to the work station 102A-102H of that module using that module's pick and place robot 106A-106H.

The carrier may first be transported to module 100A along transportation segment 104A which utilizes the pick and place robot 106A to transport the multi-well plate from the carrier to the work station 102A that includes a liquid dispenser that houses and dispenses a liquid into the multi-well plate. The multi-well plate is transferred back to the carrier by the pick and place robot 106A, and the carrier with the multi-well plate is transported along the transportation segments 104A and 104B to module 1006. This module transfers the multi-well plate to the work station 102B using pick and place robot 106B. In this example system, transportation of an item between any two modules, adjacent or not, may be considered to occur in this manner.

The work station 102B includes 100B an acoustic dispenser that generally will receive, temporarily house, and then dispense primers, such as DNA, into the multi-well plate. The multi-well plate is similarly transferred back to the carrier and to the work station 102C of module 100C which includes an acoustic dispenser that houses and dispenses a template and enzymes into the multi-well plate. The multi-well plate is then transferred to the work station 102D which includes a PCR thermocycler that thermocycles the material in the multi-well plate to cause amplification of the primer.

Following this thermocycling, the multi-well plate may be transported via the carrier along transportation segments 104D, 1560B, 1560A, and 104G where the pick and place robot 106G transports the multi-well plate to work station 102G. This module 100G may be similar to module 100C in that it contains an acoustic dispenser that houses and dispenses the same primer template and enzymes into the multi-well plate. After this dispensing into the multi-well plate, the multi-well plate is then transferred to the work station 102H of module 100H which may be considered the same or similar to module 100D in that the work station 102H is a thermocycler. The multi-well plate is then thermocycled again in order to amplify the primer in the multi-well plate.

Modules 100E and 100F may be the same or similar to modules 100A and 100B, respectively, such that work station 102E includes a liquid dispenser that houses and dispenses a liquid, like water, into the multi-well plate and the work station 102F includes 100B an acoustic dispenser that houses and dispenses primers, such as DNA, into the multi-well plate. While one multi-well plate is transported and processed along modules 100A-100D, another multi-well plate may similarly be processed and transported along modules 100E-100H.

The system of FIG. 15 may be reconfigured into a second configuration for primer amplification. FIG. 16 depicts a second configuration of the system 1562 of FIG. 15 and includes the modules 100A, 100B, and 100D, and three different modules 100I-100K; modules 100C and 100E-100H have been removed. The transportation pathway 1658 along the modules is differently shaped than in FIG. 15 and includes a spacer transportation segment 1560C that is a different, semi-circular shape; this pathway 1658 includes transportation segments 104A, 104B, 104I, 104J, 104D, and 104K. In this configuration, the multi-well plate may be first transported to modules 100A and 100B like in the first configuration of FIG. 15 such that water and primers, respectively, are dispensed into the multi-well plate. The multi-well plate may then be transported to module 100I that has a work station 1002I with an acoustic dispenser that houses and dispenses a template into the multi-well plate, and then to module 100J with a work station 1002J with a liquid dispenser that houses and dispenses enzymes and other materials into the multi-well plate. After this dispensing, the multi-well plate is transported via the carrier along the transportation pathway 1658 to the thermocycler of module 100D that thermocycles the multi-well plate and causes amplification of the primer. The multi-well plate may then be transported to the work station 1002K of module 100K which has a liquid handler that dispenses a liquid or solution into the multi-well plate to dilute the material in the multi-well plate.

Like in the configuration of FIG. 15, the multi-well plate is transferred between modules by and along the transportation pathways 1558 and 1658, and between each module and the transportation pathways 1558 and 1658 by the pick and place robot of that module. Additionally, as shown in FIGS. 15 and 16, the system may include a controller 1564 that has a processor 1566 and a memory 1568, like described above with respect to controller 1264, which may be communicatively connected to one or more of the modules in the system and configured to control one or all aspects of the system, including those steps described above. In each configuration of FIGS. 15 and 16, the modules may also be moveable as a single unit and they may be connected together as described above, such as using a bumper connection or physical connection between transportation segments.

Some systems may be configured to produce a plurality of various organisms. These systems may include a plurality of modules like those described herein, and may be configured like any other system described herein. The modules are reconfigurable into to a plurality of configurations such that in each configuration, the modules are configured to produce a different organism.

In some embodiments, the production of organisms may be considered processes related to the replication, modification, and construction of various microorganisms, like bacteria and fungi. For example, one configuration of modules may be configured to produce a first microorganism that has a first plasmid inserted within the body of the first microorganism, but not integrated into its genome, while a second configuration of modules may be configured to produce a second microorganism that has a second plasmid integrated into the second microorganism.

In other examples, different configurations of modules may be configured to produce different microorganisms having engineered genomes. The term "engineered" is used herein, with reference to a cell, to indicate that the cell contains at least one genetic alteration introduced by man that distinguishes the engineered cell from the naturally occurring cell. In some embodiments, one configuration may be configured to produce a first microorganism that produces a first molecule, while a second configuration may be configured to produce a second microorganism that produces a second molecule. Any microorganism that can be used to express introduced genes can be engineered for fermentative production of molecules. In certain embodiments, the microorganism is one that is naturally incapable fermentative production of the molecule of interest. In some embodiments, the microorganism is one that is readily cultured, such as, for example, a microorganism known to be useful as a host cell in fermentative production of molecules of interest. Bacteria cells, including gram positive or gram negative bacteria can be engineered as described above. Examples include *C. glutamicum, B. subtilis, B. licheniformis, B. lentus, B. brevis, B. stearothermophilus, B. alkalophilus, B. amyloliquefaciens, B. clausii, B. halodurans, B. megaterium, B. coagulans, B. circulans, B. lautus, B. thuringiensis, S. albus, S. lividans, S. coelicolor, S. griseus, P. citrea, Pseudomonas* sp., *P. alcaligenes, Lactobacilis* spp.

(such as *L. lactis*, *L. plantarum*), *L. grayi*, *E. coli*, *E. faecium*, *E. gallinarum*, *E. casseliflavus*, and/or *E. faecalis* cells.

In some embodiments, the microbial host cells used in the methods described herein are filamentous fungal cells. (See, e.g., Berka & Barnett, Biotechnology Advances, (1989), 7(2):127-154). Examples include *Trichoderma longibrachiatum*, *T. viride*, *T. koningii*, *T. harzianum*, *Penicillium* sp., *Humicola insolens*, *H. lanuginose*, *H. grisea*, *Chrysosporium* sp., *C. lucknowense*, *Gliocladium* sp., *Aspergillus* sp. (such as *A. oryzae*, *A. niger*, *A. sojae*, *A. japonicus*, *A. nidulans*, or *A. awamori*), *Fusarium* sp. (such as *F. roseum*, *F. graminum F. cerealis*, *F. oxysporuim*, or *F. venenatum*), *Neurospora* sp. (such as *N. crassa* or *Hypocrea* sp.), *Mucor* sp. (such as *M. miehei*), *Rhizopus* sp., and *Emericella* sp. cells. In particular embodiments, the fungal cell engineered as described above is *A. nidulans*, *A. awamori*, *A. oryzae*, *A. aculeatus*, *A. niger*, *A. japonicus*, *T. reesei*, *T. viride*, *F. oxysporum*, or *F. solani*. Illustrative plasmids or plasmid components for use with such hosts include those described in U.S. Patent Pub. No. 2011/0045563.

Yeasts can also be used as the microbial host cell in the methods described herein. Examples include: *Saccharomyces* sp., *Yarrowia* sp., *Schizosaccharomyces* sp., *Pichia* sp., *Candida* sp, *Kluyveromyces* sp., and *Hansenula* sp. In some embodiments, the *Saccharomyces* sp. is *S. cerevisiae* (See, e.g., Romanos et al., Yeast, (1992), 8(6):423-488). In some embodiments, the *Yarrowia* sp. is *Y. lipolytica*. In some embodiments, the *Kluyveromyces* sp. is *K. marxianus*. In some embodiments, the *Hansenula* sp. is H. polymorphs. Illustrative plasmids or plasmid components for use with such hosts include those described in U.S. Pat. No. 7,659, 097 and U.S. Patent Pub. No. 2011/0045563.

Microbial cells can be engineered for using conventional techniques and apparatus of molecular biology (including recombinant techniques), microbiology, cell biology, biochemistry, and immunology, which are within the skill of the art, and using equipment as described above with respect to FIG. 2.

Such techniques are explained fully in the literature, see e.g., "Molecular Cloning: A Laboratory Manual," fourth edition (Sambrook et al., 2012); "Oligonucleotide Synthesis" (M. J. Gait, ed., 1984); "Culture of Animal Cells: A Manual of Basic Technique and Specialized Applications" (R. I. Freshney, ed., 6th Edition, 2010); "Methods in Enzymology" (Academic Press, Inc.); "Current Protocols in Molecular Biology" (F. M. Ausubel et al., eds., 1987, and periodic updates); "PCR: The Polymerase Chain Reaction," (Mullis et al., eds., 1994); Singleton et al., Dictionary of Microbiology and Molecular Biology 2nd ed., J. Wiley & Sons (New York, N.Y. 1994).

In some embodiments, an organism may be produced by introducing wholly new genes into microbe. Vectors are polynucleotide vehicles used to introduce genetic material into a cell. Vectors useful in the methods described herein can be linear or circular. Vectors can integrate into a target genome of a host cell or replicate independently in a host cell. For many applications, integrating vectors that produced stable transformants are preferred. Vectors can include, for example, an origin of replication, a multiple cloning site (MCS), and/or a selectable marker. An expression vector typically includes an expression cassette containing regulatory elements that facilitate expression of a polynucleotide sequence (often a coding sequence) in a particular host cell. Vectors include, but are not limited to, integrating vectors, prokaryotic plasmids, episomes, viral vectors, cosmids, and artificial chromosomes.

The present disclosure is also suitable for use with a variety of animal cell types, including mammalian cells, for example, human (including 293, WI38, PER.C6 and Bowes melanoma cells), mouse (including 3T3, NSO, NS!, Sp2/0), hamster (CHO, BHK), monkey (COS, FRhL, Vero), and hybridoma cell lines.

An organism having a plasmid within the body of the organism may be produced in the following illustrative, non-limiting technique. The plurality of modules may include a first module having a liquid or acoustic dispenser for dispensing the plasmids into a multi-well plate, a second module having a liquid or acoustic dispenser for dispensing the organism into the multi-well plate, and a third module with an electroporation unit. In one configuration, the modules may be positioned sequentially such that the second module is interposed between the first and third modules. This configuration may be like that depicted in FIG. 1A with the first module being module 100A, the second module being module 100B, and the third module being module 100C. A carrier configured to transport the multi-well plate may be transported to the first module 100A where its pick and place robot 106A transfers the multi-well plate to the work station 102A where the plasmids are dispensed into the multi-well plate. The multi-well plate is then transferred back to the carrier which is transported to the second module 100B where the multi-well plate is transferred to the work station 102B where the organism, such as a bacterium, is dispensed into the multi-well plate. Finally, the multi-well plate is transferred back to the carrier, then to module 100C where the multi-well plate is transferred to work station 102C where electroporation occurs and the plasmid is inserted into the organism.

In a different configuration, for example, the plurality of modules may include a different module that may dispense a different organism or a different plasmid such that a different organism is produced. The different configurations, like described above, may include more or less modules than other configurations, and may include different orders of modules.

In some configurations of these modules, an organism having a different genome may be produced. The following illustrative, non-limiting technique and configuration of modules may be used to produce such an organism. The plurality of modules may include, similar to above, a module having a liquid or acoustic dispenser for dispensing a DNA plasmid or other vector into a multi-well plate, a second module having a liquid or acoustic dispenser for dispensing the organism into the multi-well plate, and a third module with an electroporation unit for causing the DNA to pass into the organism, a module with a selection unit that exposes the organism to selection media, and a module with a counterselection unit that kills or suppresses cells that do not have the genotype of interest. In some configurations, a module may be included that has a work station for analysis testing, such as a genotyping unit. In some configurations, additional modules may be included with one module having a work station for plating the colonies of the organism and the other module having a work station for picking the colonies of the organism, which may occur using imaging analysis. The plating and picking of these modules may be performed after the DNA has been incorporated into the genome of the organism and before or after the portion of the DNA has been removed. In some embodiments, this plurality of modules may be used to produce a microorganism (e.g., a bacteria, a yeast or other fungus) with a different, or engineered, genome. For example, one configuration of modules may produce an engineered bacteria while another configuration may produce an engineered fungus.

The systems configured to produce a plurality of various organisms may also include a controller that, like described above, is configured to control one or more aspects of the system, including the production of the organisms.

Any of the systems described above may include one or more controllers, like described above, that are configured to control one or more aspects of the system, such as any and all aspects of each individual module, grouping of modules, transportation pathways and elements (e.g., the movement of carriers). In some embodiments, this configuration includes the instructions and commands, stored on the one or more memories, for sending commands and reading sensor data (e.g., sensors on aspects of each module in a system like the status of a work station and positioning of a pick-and-place robot, as well as positions and speeds of carriers), as well as the ability to coordinate protocol executions across multiple modules and groupings of modules.

In some embodiments, this control includes the ability to submit and process batches of production (e.g., organism production) while other batches are running. For instance, some traditional systems operate on a batch-by-batch basis in which a batch of plates is loaded into the system, the corresponding protocol is selected, and the system works on the batch until all plates had the protocol applied. During this processing, these conventional systems generally cannot receive new orders, simultaneously run other processes, or both. With the embodiments and control described herein, it is possible to submit additional plates or batches while others are running which may allow the system to run continuously with minimal or no loss of efficiency to setup and teardown processes.

Additionally, for instance, some embodiments include the ability and configuration to run different protocols for different plates or processes on the same system at the same time. For example, referring to FIG. 15, User A might input to the controller a workorder to run Protocol 1 on twenty plates throughout the system 1562, for an overall runtime of two hours. Half an hour later, User B might submit a workorder to run Protocol 2 on two plates. If appropriate hardware is available during the running of Protocol 1 (e.g., module 100C is not being used by Protocol 1 for a period of time and Protocol 2 requires the use of module 100C), then the one or more controllers may execute both workorders in parallel, interleaving usage of devices required by both Protocols as needed.

In some embodiments, the instructions and control logic may include the representation of each module, or controllable aspect of each module, as a separate software service, and the collection of these aspects may be orchestrated by higher level services in a structure that may resemble an organizational chart. The communication paths between elements may resemble the logical hierarchy of the hardware configuration. This configuration may enable subsets of devices (e.g. modules) in a larger system (e.g., system 1562 of FIG. 15) to be disconnected for maintenance or troubleshooting without interfering with the operation of the larger system, individual devices (e.g. modules) to be removed from the larger system and still be controlled (using the lower level components) while the larger system continues operating (under control by the higher level components, e.g., such as a scheduler), and subsets of the control instructions to be deployed as appropriate for the complexity of the system controlled. For example, when controlling a single module, the higher level services may not be needed at that time.

Furthermore, as mentioned above, the systems may include a user interface for a small group of devices, even when higher level orchestration and scheduling services are not present. For larger systems, all components of the controls may be present to enable scheduling of protocols that involve multiple modules. Additionally, in some embodiments, instead of deploying the controls as desktop software on a single memory and controller (e.g., a single PC), the subject instructions can be deployed using service-oriented software architecture principles and techniques such as virtualization and containerization.

In some embodiments, the architecture of the instructions and logic stored on the one or more memories may include separate services for each modular part of a system. Combined with flexible data models for describing system configuration, this may enable the instructions to be updated to control a changed system configuration within a short amount of time, such as minutes, which may be accomplished using a graphical user interface. For example, when a single module, like module 100C of FIG. 15, is replaced with another device of the same or different type, the stored instructions may be updated to communicate with the instructions representing the new device.

The controller may be further configured to support a wide range of device types that transport payloads, and arbitrary combinations of such devices. For instance, the transportation pathway may include one magnetic track conveyor and a large number of pick-and-place transfer robots that each move payloads between the conveyor and one laboratory device (e.g., a work station at each module) and the controller is configured to operate each pick-and-place robot as well as move the items on the conveyor (e.g., the carrier); this may include the systems of FIGS. 12 and 15, for example. In some instances, the controller is configured to control other system configurations, like those which use a single robot arms (e.g., a SCARA) to move payloads between multiple laboratory devices (e.g., system 1462 of FIG. 14), as well as those which may combine a mix of pick-and-place transfer robots, SCARA robot arms, and magnetic track conveyors, as well as other mover devices including 6 degree of freedom robot arms, plate rotators, and any other device that moves a single payload at a time.

In some instances, the one or more controllers may be configured to support the creation and execution of device drivers for each device type so that higher level software can send commands to each controlled device using a common language. Additionally, the one or more controllers may use an open communications standard, such as OPC-UA.

In some embodiments, the one or more controllers are further configured to detect and dynamically react to errors of a module or a system, including by routing payloads and carriers around out-of-service laboratory devices (e.g., modules) to the extent possible. For instance, when a module or aspect thereof becomes unavailable, the schedules for the entire system may be recomputed to continue operation with the remaining modules.

The one or more controllers may also be configured to publish data about all events and conditions in the system. This may include a detailed log of actions performed and, where available, time series data gathered from the laboratory devices. This may be achieved by a message queue system.

Similar to above, different configurations of modules may be configured to produce different genetic material, such as different plasmids in each configuration, different genomic DNA in each configuration, or a plasmid in one configuration and a genomic DNA in a second configuration. For instance, a first plasmid within the body of the organism may be produced in the above illustrative, non-limiting technique which utilizes a first configuration of modules. In a second configuration of modules, a second plasmid within the body of the organism may be produced using a different configuration of modules, such as a configuration with a different acoustic dispenser or with an additional module, like a sorter.

The systems and modules describe herein provide numerous benefits over traditional manufacturing assembly lines. The modules of a system may positioned and arranged into various desired configurations which provides for flexibility that can enable production scaling up or down by using a different number or order of modules as well as different equipment. This may give a company flexibility to defer decisions on what the exact factory layout will be, what product it will produce, and what the throughput will be, because the system can be scaled up or down quickly and easily to match changes in any of these factors. In turn, this may reduce the risk associated with designing a factory when the direction of a business is volatile or new. For instance, the systems described herein may be reconfigured to meet fast changes in the business direction or product production without requiring automation engineers to design or redesign the transportation pathway(s).

The flexibility of these systems is also enabled by the mobility of each module, and modules together, which many traditional assembly lines do not have and which makes them difficult to move and reconfigure. Some traditional assembly lines may be able to move some equipment around a factory floor, but these generally require a large area, like that of a shipping container which prevents them from being moved in a service elevator or around the floor because of other equipment. Here, each module may be individually moved around other equipment and into a service elevator.

These systems also have a more compact overall design and footprint than traditional assembly lines because each system may take up only the amount of space that is needed for a production of a particular quantity of a product. Only the modules that are needed may be included and positioned along the assembly line.

For some of the modules that include a transportation segment, they may be easily positioned, reconfigured, and integrated with other modules with limited set-up and reconfiguration time. For instance, this type of module may be connected to a transportation path by connecting its transportation segment to other transportation segments, as opposed to lengthening or redesigning a traditional, customized transportation pathway like a conveyor belt; this connection is made easier because the transportation segment may be positioned at a uniform, standard location and horizontal position and because the module is moveable in the vertical direction to allow alignment between the transportation segments. This also enables carriers of material to be routed between any modules without additional parts, construction, or design. Additionally, when the module is connected to the transportation pathway, the pick and place robot does not need to be retaught because the transportation segment is in a fixed, known position with respect to the robot. If this type of module is removed from a system, another module may be easily swapped into that position, and the modules on either side of that removed module may be moved and connected to each other to close the gap.

For some of the modules that may not have a transportation segment and that are configured to connect to a transportation segment, they may be easily moved without disassembling the transportation pathway. This may enable reconfiguration of the modules, which may be a more common occurrence than a reconfiguration of the transportation pathway, without reconfiguring the transportation pathway and without aligning the transportation segments during a reconfiguration.

The systems described above also may reduce time delays experienced in traditional assembly lines. Time delays may be disadvantageous for biological and chemical processing of biological or chemical material because delays may cause uncontrolled temperature changes and evaporation that could adversely affect the biological or chemical material. For instance, a conventional line that uses a single robotic arm to transfer material between pieces of equipment may experience a transport bottleneck. In embodiments of the systems described above, any pick and place robot of a module can place containers of biological or chemical material onto the carriers which can be transported to any unoccupied module and multiple containers can be transported by the transportation pathway independently and simultaneously. Overtaking pathways can be built into the transportation pathway to avoid areas of high traffic to ensure a single carrier does not block an entire transportation pathway. These systems also reduces transportation time because containers of material are not handed-off between adjacent robotic arms, which is a time consuming process, like with many conventional assembly lines.

While the subject matter disclosed herein has been particularly described with respect to the illustrated embodiments, it will be appreciated that various alterations, modifications and adaptations may be made based on the present disclosure, and are intended to be within the scope of the present invention. It is to be understood that the description is not limited to the disclosed embodiments but, on the contrary, is intended to cover various modifications and equivalent arrangements included within the scope of the claims.

What is claimed is:

1. A system comprising:
a plurality of modules, each module comprising:
an enclosure having a height extending in a first direction and a width extending in a second direction transverse to the first direction, the enclosure defining and bounding a volume having a front, a bottom, a first side, and a second side opposite the first side,
a work station connected to the enclosure and comprising equipment that, at least when positioned within the volume of the enclosure, is configured to perform a process on a chemical material or a biological material and/or dispense a chemical material or a biological material,
a first transportation segment connected to the enclosure, spanning across at least the width of the enclosure, and having connection features configured to form a connection with a second transportation segment separate from the module, wherein the first transportation segment is configured to transport at least a carrier of the biological material or the chemical material, to be in direct contact with the second transportation segment, and to be connected to, and disconnected from, the second transportation segment using the connection features such that, in response to the first transportation segment being in direct contact with and connected to the second transportation segment using the connection features, at least the carrier of the biological material or the chemical material can be transported from the first transportation segment to the second transportation segment, and wherein the first transportation segment has a first end, a second end, and a length greater than the width of the enclosure such that, in a view perpendicular to the length, the first end extends past the first side and the second end extends past the second side, a pick and place robot connected to the enclosure and configured to secure and move at least the carrier or an object on the carrier that is pickable between the first transportation segment and the work station at least when the work station is positioned within the volume of the enclosure, the object being or containing the biological material or the chemical material, a movement mechanism connected to the enclosure and configured to allow the work station, the first transportation segment, and the pick and place robot to be moved as a single unit, and a moveable shelf connected to the enclosure and having an upper surface defining the bottom of the volume of the enclosure; and a controller having at least one processor and a memory storing instructions configured to cause the at least one processor to cause the operation of the plurality of modules, wherein:

for each module, the work station is connected to the moveable shelf and supported on the upper surface such that a height of the work station extends from the upper surface in the first direction;

for each module, the moveable shelf and the work station are configured to be moved as a single unit between a first position and a second position such that in the first position, the moveable shelf and the work station are located within the volume of the enclosure, and in the second position, the moveable shelf and the work station are located at least partially outside the volume of the enclosure; and the instructions are further configured to cause the at least one processor to cause:

the plurality of modules to run a batch process, and the plurality of modules to continue running the existing batch process in the plurality of modules while a subset of the plurality of modules is reconfigured to remove the subset of the plurality of modules from the existing batch process and added to a second batch process.

2. The system of claim 1, wherein for each module:

the work station is positioned at least partially inside the volume, and the first transportation segment is positioned outside the volume.

3. The system of claim 1, wherein for each module, the movement mechanism is configured to allow the work station, the first transportation segment, and the pick and place robot to be moved as a single unit in horizontal directions.

4. The system of claim 1, wherein for each module, the work station is one of a cell transfection unit, a cell transformation unit, a cell transduction unit, an electroporation unit, a microinjection unit, a cell deformation unit, a centrifuge, a cytometer, a deionizer, a dispenser, an evaporator, a freezer, a heater, an imager, an incubator, a liquid handler, a mixer, a nucleic acid purifier, a pipettor, a sonicator, a thermal cycler, a real-time quantitative polymerase chain reactor (qPCR), a polymerase chain reactor (PCR) machine, a cell dispenser, a colony picker, a high-performance liquid chromatography unit, a mass spectrometer, a microfluidics unit, a fermenter, an autoclave, a barcode printer, a barcode applier, a barcode reader, a capper, a decapper, a counter, an air knife, a docking station, a carousel, a hotel, a pierce tool, a plate reader, a plate sealer, a plate peeler, a plate washer, a stacker, a tube sorter, or a biosafety cabinet.

5. The system of claim 1, wherein:

each module further comprises a tunnel located over the first transportation segment, and for each module, the tunnel is configured to cover the first transportation segment.

6. The system of claim 1, wherein:

the carrier or the object includes a container configured to hold the biological material or the chemical material; and for each module, the work station further comprises equipment configured to house or store the container or perform a process on the container.

7. The system of claim 1, wherein the instructions are further configured to cause the at least one processor to recompute a batch process schedule to continue operation with remaining modules when the subset of the plurality of modules in the system becomes unavailable.

8. The system of claim 1, wherein the instructions are further configured to cause the at least one processor to cause the plurality of modules to continue running the existing batch process without requiring redesign of the second transportation segment.

9. The system of claim 1, wherein the instructions are further configured to cause the at least one processor to cause the plurality of modules to continue running the existing batch process while a module is disconnected from the system.

10. The system of claim 1, wherein the instructions are further configured to cause the at least one processor to cause the plurality of modules to continue running the existing batch process while a module is removed from the system.

11. The system of claim 1, wherein the instructions are further configured to cause the at least one processor to cause the plurality of modules to continue running the existing batch process while a module is repositioned from one location to another location.

12. The system of claim 1, wherein the instructions are further configured to cause the at least one processor to cause the plurality of modules to run different protocols for different processes on the plurality of modules at the same time.

13. The system of claim 1, wherein the instructions are further configured to cause the at least one processor to cause the plurality of modules to run the second batch process while continuing to run the existing batch process.

14. The system of claim 1, wherein the instructions are further configured to cause the at least one processor to cause:

the carrier to move across the modules, each pick and place robot of a module to move an element between the transportation segment and the work station of the module, and each work station to perform a process on or house the biological or chemical material or on the material container.

15. The system of claim 1, wherein each module further comprises a bumper connection that:

extends away from the enclosure by a first horizontal distance, includes a bumper surface at an end of the bumper connection that is farthest from the enclosure, wherein the bumper surface is configured to be in contact with a part of another module, and includes second connection features configured to form a connection with the part of the another module.

16. The system of claim 15, wherein for each module:

the part of the another module is a bumper surface of a bumper connection of that another module, and the bumper connection of the module is configured to connect with the bumper connection of the another module with second connection features that connect to and secure the bumper connections together.

17. The system of claim 1, wherein for each module, the pick and place robot further comprises a gripper having gripping surfaces configured to grip the carrier or the object on the carrier while the pick and place robot transports the carrier or the object between the work station and the first transportation segment.

18. The system of claim 17, wherein the gripper includes alignment features configured to contact alignment surfaces on the carrier in order to grip the carrier or the object on the carrier.

19. The system of claim 18, wherein the alignment features are pins that extend away from a frame of the gripper.

20. The system of claim 19, wherein the gripper further includes a frame and flaps that extend towards each other and away from the frame at a different angle than the pins.

21. The system of claim 17, wherein the gripper includes:

a frame having a first extension and a second extension that both extend in a direction parallel to a first axis, the gripping surfaces positioned between the first extension and the second extension, a first alignment feature connected to the first extension and extending away from the first extension in a direction parallel to a second axis different than the first axis, a second alignment feature connected to the second extension and extending away from the second extension in the direction parallel to the second axis, a first flap connected to the first extension, extending away from the first extension, extending towards the second extension, and extending in a direction parallel to a third axis different than the first and second axes, and a second flap connected to the second extension, extending away from the second extension and towards the first extension, and in the direction parallel to the third axis.

22. The system of claim 21, wherein:

the first axis is perpendicular to the second axis, and the third axis is perpendicular to the first axis and the second axis.

* * * * *